US010469324B2

(12) United States Patent
Cook et al.

(10) Patent No.: US 10,469,324 B2
(45) Date of Patent: Nov. 5, 2019

(54) VIRTUAL NETWORK VERIFICATION SERVICE

(71) Applicant: Amazon Technologies, Inc., Seattle, WA (US)

(72) Inventors: John Cook, Brooklyn, NY (US); Catherine Dodge, Seattle, WA (US); Sean McLaughlin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 15/359,500

(22) Filed: Nov. 22, 2016

(65) Prior Publication Data
US 2018/0145879 A1    May 24, 2018

(51) Int. Cl.
*H04L 12/24*    (2006.01)
*H04L 12/46*    (2006.01)
*H04L 29/08*    (2006.01)
*H04L 12/26*    (2006.01)

(52) U.S. Cl.
CPC .......... *H04L 41/12* (2013.01); *H04L 12/4641* (2013.01); *H04L 41/024* (2013.01); *H04L 41/50* (2013.01); *H04L 43/0811* (2013.01); *H04L 67/02* (2013.01)

(58) Field of Classification Search
CPC ..... H04L 41/12; H04L 67/02; H04L 12/4641; H04L 41/024; H04L 43/0811; H04L 41/50
See application file for complete search history.

(56) References Cited

U.S. PATENT DOCUMENTS

| 2002/0091942 | A1  |   | 7/2002 | Cooper et al. |           |
|--------------|-----|---|--------|---------------|-----------|
| 2011/0213870 | A1  | * | 9/2011 | Cai           | H04L 67/10 |
|              |     |   |        |               | 709/223   |
| 2011/0219434 | A1  | * | 9/2011 | Betz          | G06F 21/00 |
|              |     |   |        |               | 726/5     |

(Continued)

FOREIGN PATENT DOCUMENTS

| GB | 2424539 A | * | 3/2005 | ............. H04L 41/08 |
| GB | 2424539   |   | 9/2006 |                          |

OTHER PUBLICATIONS

International Search Report and Written Opinion, dated Mar. 1, 2018, Amazon Technologies, Inc., pp. 1-13.

(Continued)

*Primary Examiner* — Shean Tokuta
*Assistant Examiner* — Juan C Turriate Gastulo
(74) *Attorney, Agent, or Firm* — Robert C. Kowert; Meyertons, Hood, Kivlin, Kowert & Goetzel, P.C.

(57) ABSTRACT

A virtual network verification service for provider networks that leverages a declarative logic programming language to allow clients to pose queries about their virtual networks as constraint problems; the queries may be resolved using a constraint solver engine. Semantics and logic for networking primitives of virtual networks in the provider network environment may be encoded as a set of rules according to the logic programming language; networking security standards and/or client-defined rules may also be encoded in the rules. A description of a virtual network may be obtained and encoded. A constraint problem expressed by a query may then be resolved for the encoded description according to the encoded rules using the constraint solver engine; the results may be provided to the client.

21 Claims, 16 Drawing Sheets

(56) References Cited

U.S. PATENT DOCUMENTS

| | | | |
|---|---|---|---|
| 2013/0047230 A1* | 2/2013 | Krishnan | H04L 63/102 726/7 |
| 2014/0189125 A1 | 7/2014 | Amies et al. | |
| 2015/0281269 A1 | 10/2015 | Ali-Ahmad et al. | |
| 2016/0112269 A1 | 4/2016 | Singh et al. | |

OTHER PUBLICATIONS

Kals, Stefan, et al. "Secubat: a web vulnerability scanner." Proceedings of the 15th international conference on World Wide Web. ACM, 2006, pp. 1-10.

Burns, James, et al. "Automatic management of network security policy." DARPA Information Survivability Conference & Exposition II, 2001 DISCEX'01. Proceedings. vol. 2. IEEE, 2001, pp. 1-15.

Wang, Anduo, et al. "Declarative network verification." International Symposium on Practical Aspects of Declarative Language. Springer Berlin Heidelberg, 2009, pp. 1-15.

"Security Monkey Quick Start Guide", Retrieved from URL: http://securitymonkey.readthedocs.io/en/latest/quickstart.html, pp. 1-27.

* cited by examiner

VIRTUAL NETWORK VERIFICATION SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Figure 1:
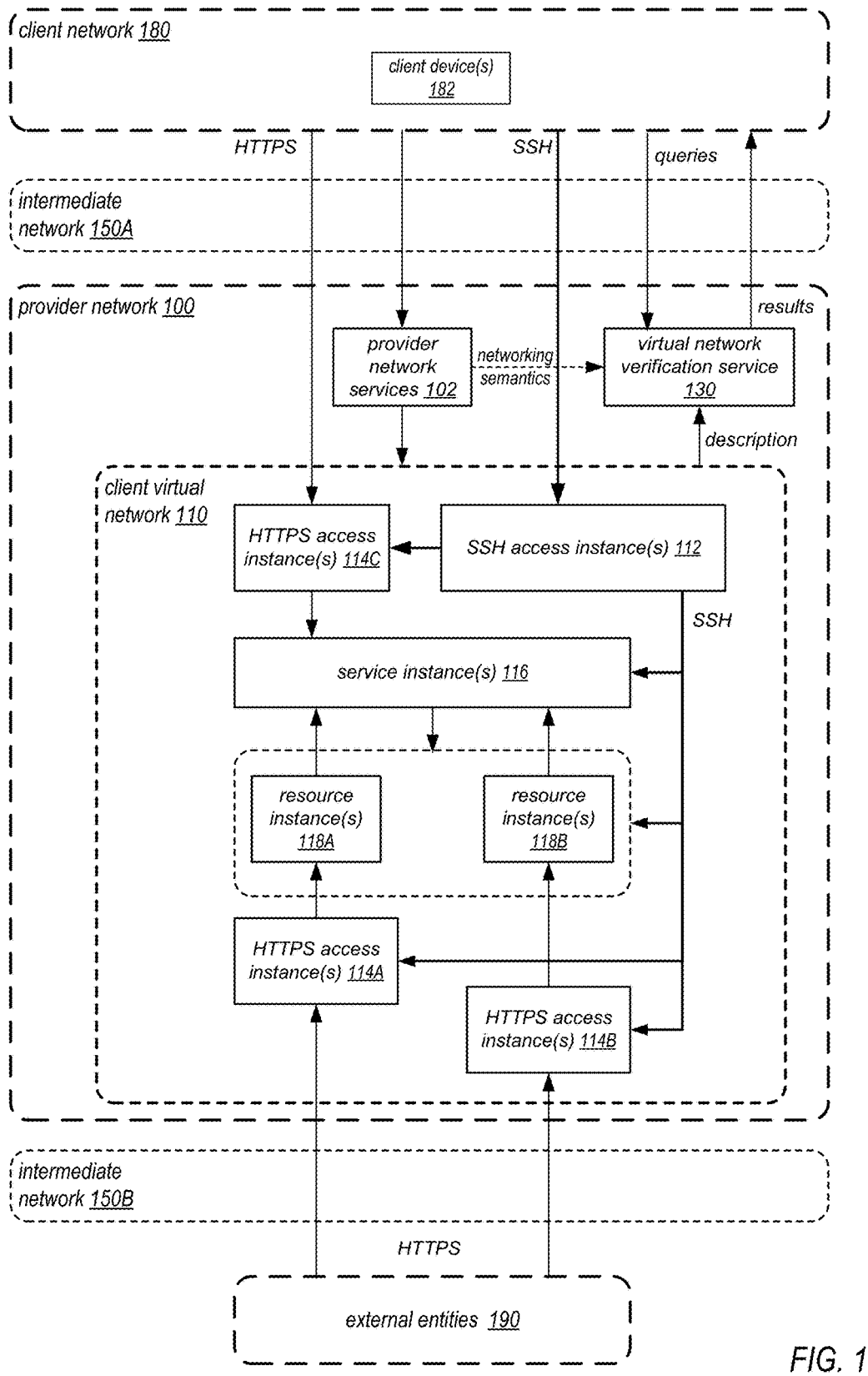
FIG. 1 illustrates a virtual network verification service in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for verifying virtual networks in provider network environments are described. Embodiments of a virtual network verification service are described that leverage a declarative logic programming language to allow clients to express queries, including recursive queries, about their virtual networks on provider networks as constraint problems, and provide results for the queries by resolving the queries using a constraint solver (e.g., a satisfiability modulo theories (SMT) solver) engine. An example declarative logic programming language that may be used in some embodiments is Datalog. Note that other declarative logic programming languages may be used.

Various provider network services may be used by clients to provision and configure networking primitives in their virtual networks; each service may provide its own application programming interfaces (APIs) and networking semantics. Conventionally, while code samples and documentation may be provided for each service, there has been no formal description of the interactions between the networking primitives in virtual networks. In embodiments, virtual networking semantics and logic for the networking primitives may be expressed and encoded as a set of virtual networking rules according to the logic programming language. The virtual networking rules may include rules that express common relationships and interactions among the various networking primitives that may be implemented in virtual networks and that are provided by the provider network's services and APIs. Thus, embodiments may provide, in one location or file, virtual networking rules that describe the logic of how virtual networking works in the provider network environment.

In some embodiments, the virtual networking rules may incorporate rules that encode networking security standards such as the Payment Card Industry Data Security Standard (PCI DSS), the Federal Risk and Authorization Management Program (FedRAMP) standard, or the Health Insurance Portability and Accountability Act (HIPPA) standard, or a client's internal security standards. In some embodiments, the virtual network verification service may provide two or more different sets of virtual networking rules that each encode different networking security standards that may be selectively used by clients to verify that their virtual networks conform to particular standards. In some embodiments, the virtual network verification service may allow a client to define custom rules that encode the client's internal security standards, best practices, or other networking requirements, and thus sets of virtual networking rules may be implemented that include custom rules defined by the clients for application to their particular virtual networks.

In embodiments, the virtual network verification service obtains descriptive information for a client's virtual network. The descriptive information may, for example, identify instances of the networking primitives that are implemented in the virtual network, include descriptions of the instances (e.g., roles assigned to computation instances, permissions granted to or denied to resource instances, IP addresses assigned to the instances, etc.), describe relationships among the instances (e.g., paths over the network between instances), and describe interfaces or access points to external entities (e.g., computation instances that can be accessed by entities external to the virtual network). In some embodiments, the client may obtain the descriptive information from the virtual network and provide the descriptive information to the virtual network verification service. Alternatively, in some embodiments, the client may grant permission to the virtual network verification service to allow the virtual network verification service to obtain the descriptive information directly from the virtual network. The virtual network verification service may encode the descriptive information as logic programs according to the declarative logic programming language.

Embodiments of the virtual network verification service may provide significant advantages when compared to conventional network analysis methods such as port scanning and syntactic check methods. Unlike these conventional methods, through the encoded virtual networking rules and virtual network description, the virtual network verification service has knowledge of all networking primitives and resource instances as well as their complex interrelationships. Unlike conventional methods that rely on devices being up at the time of the scan, and that thus may only identify paths over the network between devices that exist at the time of the scan, the descriptive information may be obtained by the client or by the service using only DESCRIBE calls to APIs of one or more provider network services that maintain metadata describing virtual networks, and thus paths over the network can be identified even if respective devices or instances are not up and listening. Further, port scanning methods may identify the existence of threats, but not the absence of threats. Syntactic check methods may check shallow properties of individual network devices, but do not identify the presence or absence of attack vectors. Embodiments of the virtual network verification service, on the other hand, may find all possible deviations from network policies as expressed in the encoded virtual networking rules, and may identify both the presence and the absence of threats and attack vectors. In addition, the descriptive information may be obtained by the client or by the service using only DESCRIBE calls to one or more provider network services that maintain metadata describing virtual networks, and thus unlike conventional methods such as port scanning methods that require substantial network and CPU bandwidth there is little or no impact on the client's virtual network, and further complete network access to every device on the provider network is not required as is the case with port scanning methods.

In embodiments, the virtual network verification service receives queries from the client. In some embodiments, the queries may be posed in an expressive query language that is similar to SQL, but that applies to network configurations. A non-limiting example of such a query may be something like "VNVS query-i list: can-ssh(A,B)" that requests the virtual network verification service (VNVS) to provide a list of all pairs of instances such that instance A can SSH to instance B. Alternatively, in some embodiments, the queries may be posed in human-friendly ways. A non-limiting example of such a query may be something like "Show me a list of all pairs of instances, such that an instance A can SSH into an instance B." In some embodiments, at least some queries may be pre-defined and provided to the client in user interface elements (e.g., menus) via a graphical interface to the virtual network verification service.

The queries correspond to theorems about the generated logic programs and express constraint problems. The virtual network verification service resolves the constraint problems expressed by the queries for the encoded description according to the encoded rules using a constraint solver program (also referred to as a constraint solver engine) configured to resolve constraint problems according to the declarative logic programming language, and provides the results to the client. In some embodiments, the virtual network verification service may provide an API and interface for posing queries. In some embodiments, the virtual network verification service may provide a set of standard queries that the client can select via the API and interface. In some embodiments, the virtual network verification service may allow the client to compose and submit custom queries via the API and interface.

In embodiments, the virtual network verification service may be used by a client, via a graphical interface to the service on a console or via a command line interface (CLI), to obtain answers to questions (posed as queries that specify constraints) about their virtual network on the provider network. Example questions that may be posed as queries include, but are not limited to:

Which instances in the virtual network are accessible from the Internet?

Which instances can access specified resources on the virtual network (e.g., a database, a cache, a storage endpoint, another instance, etc.)?

Does the virtual network conform to best practices of a networking security standard?

Does the virtual network comply with my company's best practices as encoded in this set of rules?

More generally, the virtual network verification service may be used by a client to verify that expected pipes between resources in the virtual network and other resources in the virtual network, as well as expected pipes to external entities, are open, and that the expected pipes are the only open pipes (e.g., that external entities cannot reach resources in the virtual network which they should not be allowed to reach).

Verifying that a pipebetween a resource and other resources in the virtual network or a pipe between a resource in the virtual network and external entities is open may include verifying that there is a path or route over the network (i.e., that there is network connectivity) between the resources or between a resource and the external entities (e.g., a path from the resource to an HTTPS gateway via which external entities may access resources on the virtual network). A path may be a direct path over the network that provides network connectivity between endpoints, or alternatively may be a transitive path that passes through one or more hops on a route and that provides network connectivity between endpoints. Descriptive information for the virtual network may be obtained using only DESCRIBE calls to APIs of one or more provider network services that maintain metadata describing virtual networks, and thus paths may be verified even if respective devices or instances are not up and listening. In some embodiments, the descriptive information for the virtual network may include permissions granted or denied to resources (e.g., a permission granting or denying one resource access to an endpoint on the virtual network, permissions specifying IP address ranges or particular ports of resource instances that can or cannot access a given endpoint (e.g., a storage endpoint), etc.). In these embodiments, verifying that a path in the virtual network is open may include verifying that the required permissions for the path have been granted. Similarly, verifying that expected paths are the only open paths may include determining that resources in the virtual network or external entities do not have permission to access resources that they should not have access to.

Embodiments of the virtual network verification service with appropriate sets of virtual networking rules may, for example, be used by clients to help the customers verify that their virtual networks comply with networking security standards such as the Payment Card Industry Data Security Standard (PCI DSS), the Federal Risk and Authorization Management Program (FedRAMP) standard, or the Health Insurance Portability and Accountability Act (HIPPA) standard, or to verify that their virtual networks comply with the client's internal security standards or other internal networking requirements.

Another example application for embodiments of the virtual network verification service is for identifying possible impact in the virtual network of vulnerabilities such as network security issues or software bugs. For example, if a vulnerability is discovered in a particular software program running on a particular instance in the virtual network, the client may compose and submit queries to determine all the ways that this instance can communicate with other instances in the virtual network. The results may allow the client to identify the possible impact of the vulnerability, and thus to make a decision as to how to best handle the situation. For example, if there is no direct path from the instance with the vulnerability to an instance with a mission-critical database, the problem may be given a lower priority to be handled according to a normal maintenance schedule. If the instance with the vulnerability will impact the instance with the mission-critical database, the decision may be made to shut down at least part of the virtual network to address the vulnerability immediately.

Another example application for embodiments of the virtual network verification service is in offline testing of changes to virtual networking for the provider network environment. For example, the virtual networking rules that describe the logic of how virtual networking works in the provider network environment can be used in a testing environment to test changes to the virtual networking primitives before the changes are applied to the provider network to determine what effects the changes may have on virtual networks.

Another example application for embodiments of the virtual network verification service is in automatically synthesizing virtual networks for clients. For example, a client may want to establish a virtual network that complies with a particular networking security standard and that contains a specified set of networking primitives. The virtual network verification service and virtual networking rules can be used in automatically synthesizing and verifying a virtual network that satisfies all of the constraints (client-specified primitives, networking security standard, virtual networking rules that describe the logic of how virtual networking works in the provider network environment, etc.) so that the client does not have to build and test the virtual network themselves. For example, constraints imposed by the standards can be posed as queries, and the queries can be resolved to determine a virtual network configuration that satisfies the constraints, or alternatively to determine if the configuration of a virtual network conforms to the constraints. A virtual network that conforms to the constraints may then be synthesized, or alternatively a virtual network may be modified to conform to the constraints.

Another example application for embodiments of the virtual network verification service is in allowing a client to verify new virtual network configurations or changes to existing virtual networks before the configurations or changes are implemented on the provider network. For example, a virtual network configuration may be generated or modified by the client, and constraints for the configuration can be posed as queries; the queries may be resolved to verify that the configuration conforms to the client's constraints as posed in the queries before the configuration is implemented on the provider network.

FIG. 1 illustrates a virtual network verification service in a provider network environment, according to some embodiments. A service provider that provides a provider network 100 for clients may provide services and application programming interfaces (APIs) 102 that allow clients to establish and manage resources in virtual networks 110 on the provider network 100. A virtual network 110 in a provider network 100 environment may be broadly defined as a network space (e.g., logically defined by an address range or address space) that contains a set of provider network resources of a respective client, and that acts as a logically isolated section on the provider network 100 for the client's resources. A virtual network 110 may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host devices, etc.) on a virtual network 110 may be assigned IP addresses (e.g., 32-bit IPv4 addresses) within the virtual network 110's address space. A client's virtual network 110 on the provider network 100 includes the client's resource instances, such as virtual machines (VMs) on host devices configured as virtual computing resource instances by the client. At least some of the resource instances on a provider network may be implemented according to hardware virtualization technology that enables multiple operating systems to run concurrently on a host computer, i.e. as VMs on a host device. A hypervisor, or virtual machine monitor (VMM), on the host device presents the VMs on the respective host with a virtual platform and monitors the execution of the VMs on the host device. Each VM may be provided with one or more IP addresses; the VMM on a respective host may be aware of the IP addresses of the VMs on the host.

Figure 14:
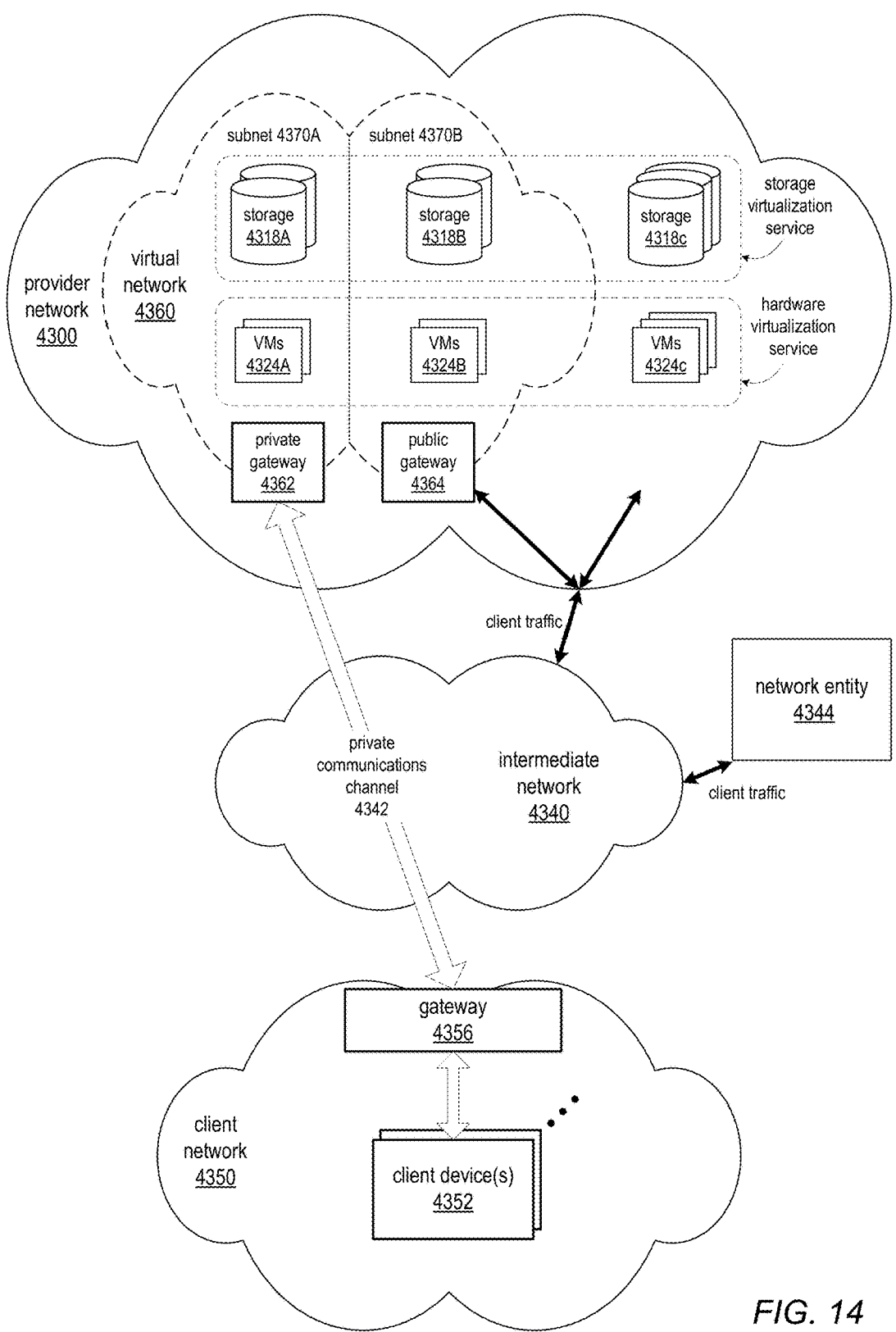
FIG. 14 illustrates an example provider network that provides virtual networks to at least some clients, according to some embodiments.
Figure 15:
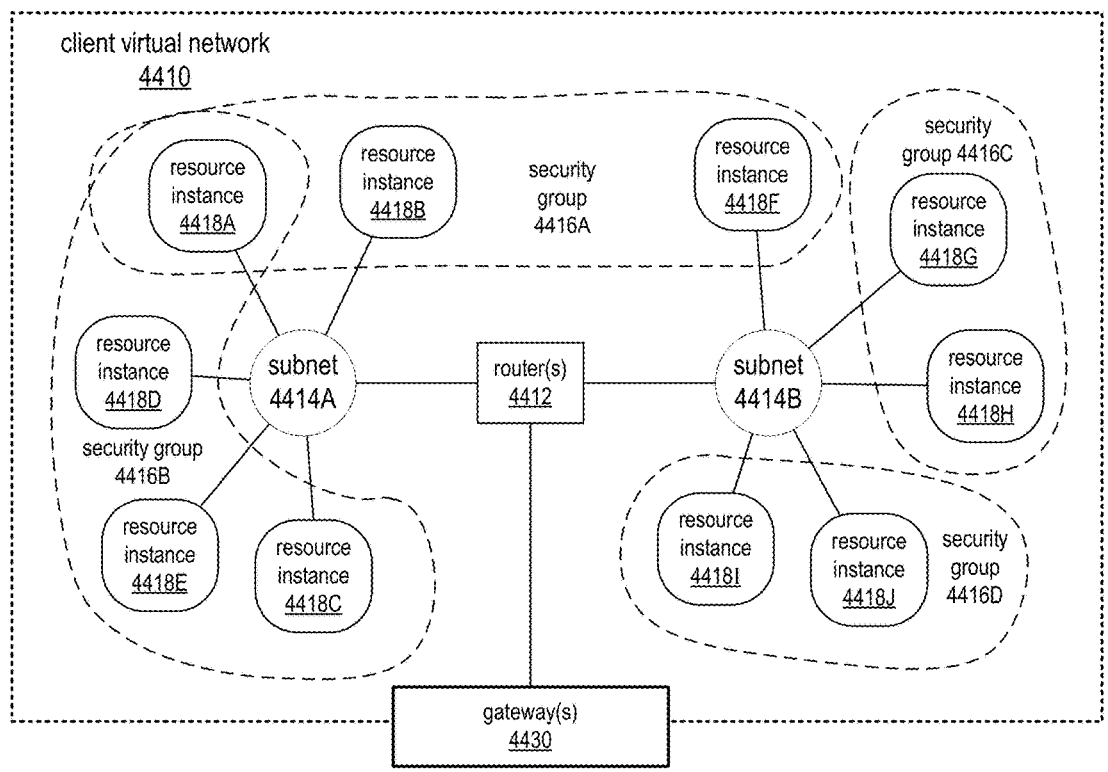
FIG. 15 illustrates subnets and security groups in an example virtual network on a provider network, according to some embodiments.

Various networking resources, structures, and functionalities (referred to as networking primitives) may be provided to clients of the provider network 100 via the various provider network services 102. Clients may create, configure, populate, and modify their virtual networks 110 on the provider network 100 at least in part using the various services and APIs 102. The following lists example networking primitives that may be provided by the services 102, and is not intended to be limiting:

- Virtual networks, for example as illustrated in FIGS. 1, 14, and 15.
- Resource instances (e.g., VMs configured as virtual computing resource instances (e.g., application servers, web servers, database servers, access points, gateways, load balancers, instances of particular provider network services such as logging services, network monitoring and analysis services, code repository services, container management services, etc.) by the client using the services 102).
- Tags—In some embodiments, a client may be allowed to assign particular roles to particular resource instances (e.g., VMs) within their virtual network(s) by tagging the resource instances. A tag may, for example, be a text string such as PROD or DEV. The tags may be stored in metadata for the resource instances. The tags may include standard provider network-defined tags and/or client-defined tags. Example roles for resource instances include, but are not limited to, Secure Socket Shell (SSH) access instances, logging service instances, code repository instances, production resource instances, and development resource instances.
- Virtual network endpoints (e.g., endpoints such as computation resources, storage resources, servers, host devices, etc.).
- Virtual network peering connections. In some embodiments, a client may establish two or more virtual networks on a provider network. A peering connection may be established between the virtual networks that allows the virtual networks to securely communicate over the provider network without having to traverse an external network such as the Internet.
- Internet gateways that provide access to at least some of a virtual network's resources from entities external to the virtual network.
- Load balancers, for example virtualized load balancer instances that distribute network traffic among a group or cluster of resource instances on a virtual network.
- Network Address Translation (NAT) instances.
- NAT gateways.
- Network Access Control Lists (ACLs).
- Network interfaces.
- Route tables.
- Subnets—A virtual network may be, but is not necessarily, subdivided into two or more subnetworks, or subnets, for example as illustrated in FIGS. 14 and 15.
- Security groups—In some embodiments, the provider network may allow a client to establish and manage virtual security groups within the client's virtual network, within or across subnets, for example as illustrated in FIG. 15. A security group is a logical grouping of resource instances and acts as a virtual firewall that controls the traffic allowed to reach one or more resource instances within the security group according to security group rules.
- Regions—Provider network services and resources (e.g., virtual networks, VM instances, data storage, gateways, load balancers, etc.) may be supported in multiple geographic locations or areas. As used herein, a region is a separate geographic area that supports the provider network services and in which a client may launch and configure resources. The services and APIs may allow clients to launch or replicate their resources in one or more regions.
- Zones—Each region may include multiple, isolated locations, referred to herein as zones. A client's resource instances may be distributed across multiple zones within a region so that, if a resource instance in one zone fails, an instance in another zone can handle requests.

In some embodiments, clients may establish virtual networks 110 on the provider network 100 that include instances of one or more of the above networking primitives using respective provider network services 102. FIG. 1 illustrates an example virtual network 110 on a provider network 100, and is not intended to be limiting. A client's virtual network 110 may include resources instances 118 (e.g., VMs) that implement the functionality of the virtual network, for example application servers, web servers, database servers, and so on. The resources instances 118 may include groups or clusters of instances 118A and 118B; for example, instances 118A may represent a production environment, while instances 118B may represent a development environment. In some embodiments, instances 118A and 118B may be in different subnets and/or security groups.

A client's virtual network 110 may also include service instances 116 (e.g., VMs) that implement particular provider network services in the client's virtual network 110 such as application and operating system logging services, network monitoring and analysis services, code repository services, container management services, and so on.

A client's virtual network 110 may also include access instances that enable devices 182 on the client network 180 and other external entities 190 to communicate with resources and endpoints within virtual network 110 via an intermediate network 150 such as the Internet. Access instances may, for example, include load balancers and gateways (Internet gateways, NAT gateways, etc.). As shown in this example, in some embodiments the access instances may include HTTPS access instances 114 and SSH access instances 112. HTTPS access instances 114 may include instances 114A and 114B for accessing resource instances 118A and 118B, respectively, from external entities 190 using the HTTPS protocol, as well as instances 114C for accessing service instances 116 from devices 182 on client network 180 using the HTTPS protocol. In some embodiments, a client may access resource instances in the virtual network 110 from a device 182 (e.g., a console) on the client network 180, for example using SSH. In some embodiments, to access a resource instance using SSH, the client is given an IP address of the instance and a key. The client can then directly SSH into the instance using the provided information. In some embodiments, an SSH access instance 112 may act as a proxy that allows the client to access the client's resource instances on the virtual network 110 from a device 182 (e.g., a console) on the client network 180 using the SSH protocol. For example, an SSH access instance 112 may be in a publicly accessible subnet of the client's virtual network. At least some of the client's resource instances may be in a subnet that is not publicly accessible. These resource instances may be in a security group that allows SSH access from a security group attached to the SSH access instance 112. The client may connect to the SSH access instance 112 to connect to the client's resource instances.

Figure 2:
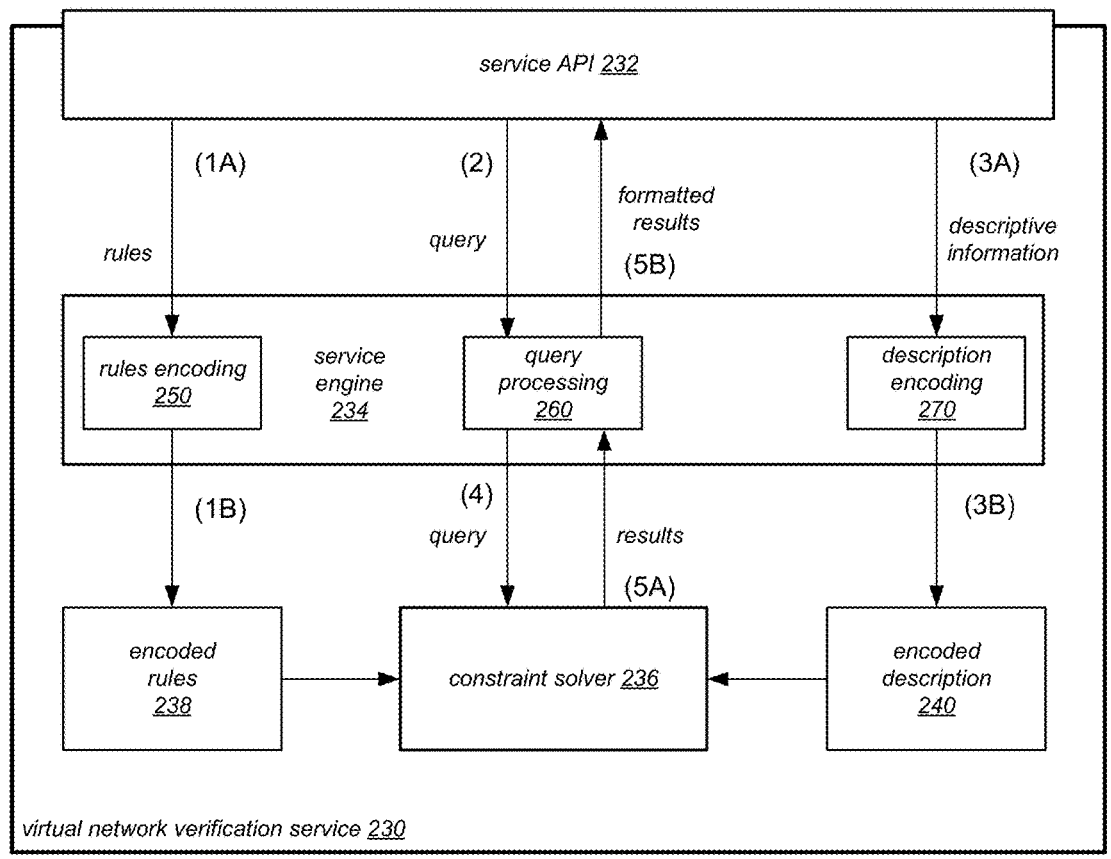
FIG. 2 illustrates components and operation of an example virtual network verification service, according to some embodiments.

As shown in FIG. 1, the provider network 100 may include a virtual network verification service 130 implemented by one or more computing devices on the provider network 100. In some embodiments, an instance of virtual network verification service 130 may be implemented on the client's virtual network 100, for example by an SSH access instance 112 as illustrated in FIG. 1. The virtual network verification service 130 leverages a declarative logic programming language (e.g., Datalog) to allow the client to express queries, including recursive queries, about their virtual networks on provider networks as constraint problems, and that provides results for the queries by resolving the queries using a constraint solver engine. FIG. 2 illustrates a virtual network verification service 130, according to some embodiments.

Referring to FIG. 1, in the virtual network verification service 130, virtual networking semantics and logic for networking primitives provided by services 102 may be expressed and encoded as a set of virtual networking rules according to the logic programming language. The virtual networking rules may include rules that express common relationships and interactions among the various networking primitives that are implemented in virtual network 110. The virtual networking rules may also incorporate rules that encode networking security standards (e.g., PCI, FedRAMP, HIPPA, etc.), or a client's internal security standards or other networking requirements.

Figure 3:
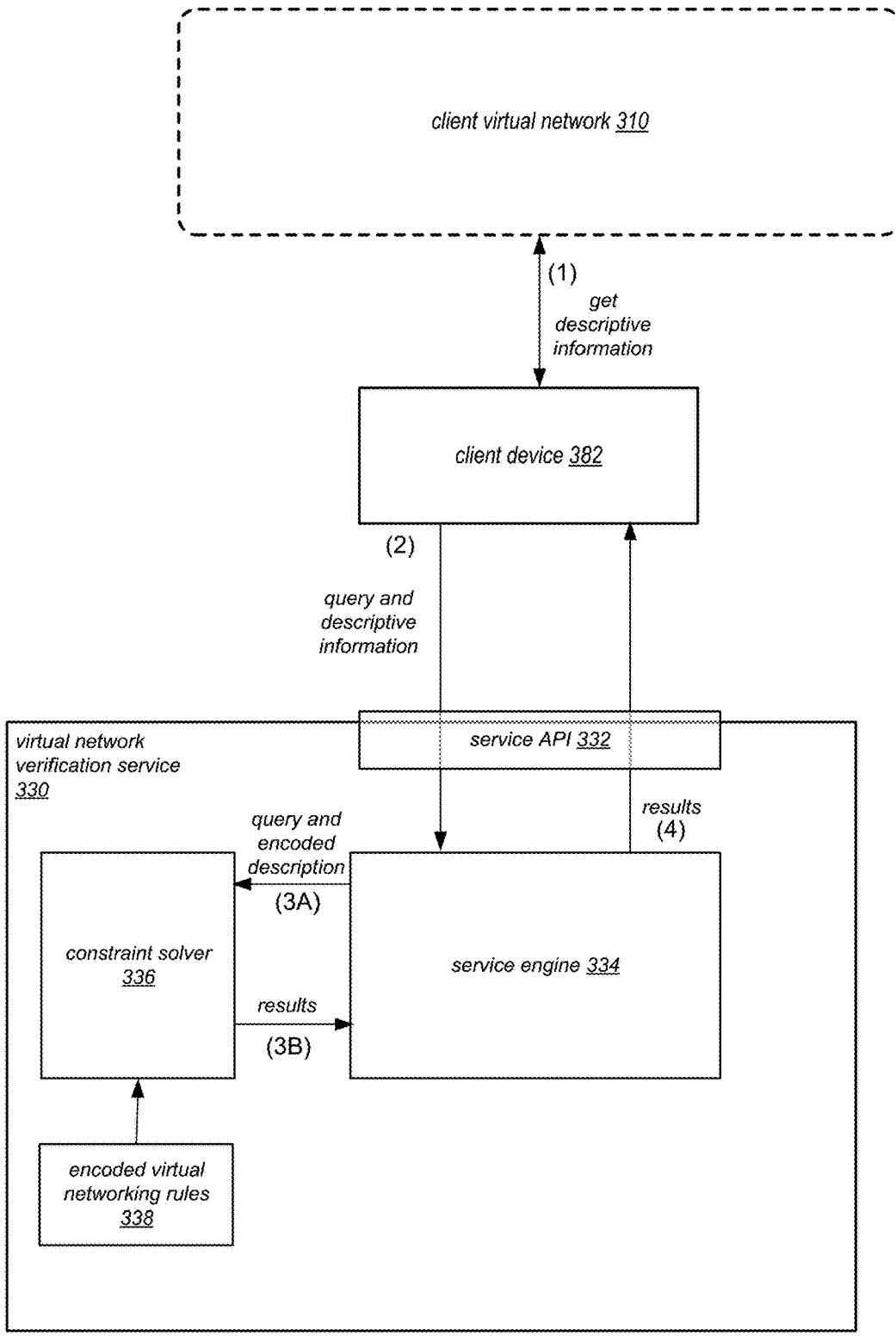
FIG. 3 illustrates a client providing descriptive information for a virtual network and queries to a virtual network verification service that processes the query and provides results to the client, according to some embodiments.
Figure 4:
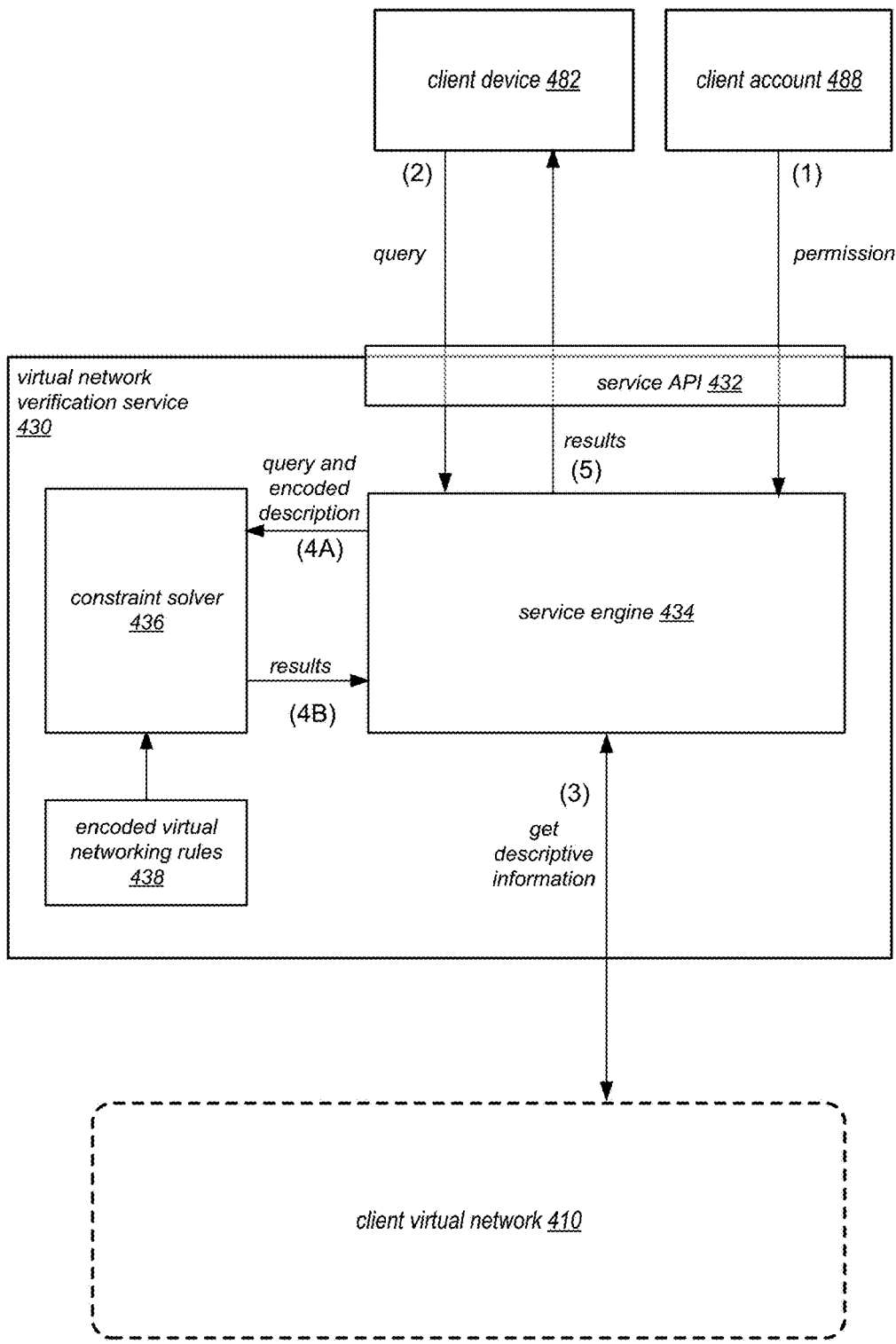
FIG. 4 illustrates a client providing queries and permission to access a virtual network to a virtual network verification service that obtains descriptive information from the virtual network, processes the query, and provides results to the client, according to some embodiments.

The virtual network verification service 130 obtains descriptive information for the client's virtual network 110. The descriptive information may, for example, identify instances of the networking primitives that are implemented in the virtual network 110, include descriptions of the various instances (e.g., roles assigned to instances, permissions granted to or denied to instances, IP addresses assigned to the instances, etc.), describe relationships among the instances (e.g., paths between instances), and describe interfaces or access points to external entities 190. In some embodiments, the client may obtain the descriptive information from the virtual network 110 and provide the descriptive information to the virtual network verification service 130, as shown in FIG. 3. Alternatively, in some embodiments, the client may grant permission to the virtual network verification service 130 to allow the virtual network verification service 130 to obtain the descriptive information directly from the virtual network 110, as shown in FIG. 4. The virtual network verification service 130 may encode the descriptive information as logic programs according to the declarative logic programming language.

The virtual network verification service 130 leverages a declarative logic programming language, and allows clients to pose queries about their virtual networks 110 on the provider network 100, for example via a graphical interface or a command line interface (CLI) to the service 130 on a client device 182 in the client network 180. An example logic programming language that may be used in some embodiments is Datalog. Note that other declarative logic programming languages may be used. In some embodiments, the queries may be posed in an expressive query language that may be somewhat similar to SQL, but that applies to network configurations. Alternatively, in some embodiments, the queries may be posed in human-friendly ways. The queries correspond to theorems about the generated logic programs and express constraint problems. The virtual network verification service 130 resolves the constraint problems expressed by the queries for the encoded description according to the encoded rules using the constraint solver engine and provides the results to the client. In some embodiments, the virtual network verification service 130 may provide an API and interface for posing queries. In some embodiments, the virtual network verification service 130 may provide a set of standard queries that the client can select via the API and interface. In some embodiments, the virtual network verification service 130 may allow the client to compose and submit custom queries via the API and interface.

The following describes example queries that may be posed by the client about the example virtual network shown in FIG. 1, and is not intended to be limiting.

In some embodiments of a virtual network 110, resources on the virtual network 110 should only be accessible via SSH through SSH access instance(s) 112 from designated endpoints on client network 180. Thus, the client may want to verify that no instances in virtual network 110 are accessible via SSH from endpoints on the intermediate network 150. An example query to verify this may be expressed as:

```
all Instance:
    !internet-can-ssh-to-instance(Instance).
```

The client may also want to verify that, from the client network 180, the SSH access instance(s) 112 on the virtual network 110 are accessible via SSH. As previously noted, in some embodiments, at least some of a client's instances in the virtual network 110 may be assigned particular roles; the roles may be indicated by tags stored in metadata for the instances. The tags may be included in the descriptive information, and thus may be indicated in the encoded description for the virtual network 110. Thus, in some embodiments tags may be used in queries, for example to verify that instances that are assigned particular roles can actually perform those roles. An example query to verify that, from the client network 180, the SSH access instance(s) 112 on the virtual network 110 are accessible via SSH may be expressed as:

```
all Instance:
    atom/instance-tag(Instance, tag-key/Name,
    tag-value/SSHAccessInstance)
    <=> ClientNetwork-can-ssh-to-instance(Instance).
```

The above expression, when evaluated by the constraint solver, checks all instances on the virtual network 110; for instances that are tagged as SSHAccessInstance, the constraint solver determines if the instance is reachable via SSH from the client network 180, returning TRUE if so and FALSE if not.

The following lists some other examples of aspects of the virtual network 110 that a client may verify by posing appropriate queries to the virtual network verification service 130, and is not intended to be limiting:

Only the SSH access instance(s) 112 are accessible via SSH from the client network 180.

Resource instances 118A and 118B are reachable through their respective HTTPS access instances 114A and 114B by external entities 190 via intermediate network 150B (e.g., the Internet).

Resource instances 118A and 118B can reach intermediate network 150B to authenticate requests.

Resource instances 118A and 118B can write to specified service instances 116.

Specified service instances 116 can be reached from the client network 180 through HTTPS access instance(s) 114C.

Specified service instance 116 can reach specified endpoints on the virtual network 110.

All instances are tagged with one of a set of specified tags.

FIG. 2 illustrates components and operation of an example virtual network verification service, according to some embodiments. Virtual network verification service 230 may be implemented by one or more computing devices on a provider network. In some embodiments, an instance of virtual network verification service 230 may be implemented on the client's virtual network, for example by an SSH access instance 112 as illustrated in FIG. 1. As shown in FIG. 2, in some embodiments, the virtual network verification service 230 may include a service engine 234, a constraint solver 236 engine, and an API 232. Service engine 234 may implement, but is not limited to, rules encoding 250 logic, query processing 260 logic, and description encoding 270 logic. Constraint solver 236 is a declarative logic programming language engine configured to resolve queries, including recursive queries, about the virtual network as represented by the encoded description 240 based on encoded virtual networking rules 238. API 232 exposes functionality of the service 210 to external entities including but not limited to the client.

At (1A) and (1B) of FIG. 2, rules encoding 250 logic of the service 230 may obtain (1A) and encode (1B) virtual networking rules 238 to be applied to the virtual network. Rules to be encoded may be obtained from the service provider, from the client, or from other external entities or sources. Example encoded rules 238 are provided later in this document.

In embodiments, virtual networking semantics and logic for the networking primitives used in virtual networks may be obtained and encoded as a set of virtual networking rules 238 according to the logic programming language. The virtual networking rules 238 may include rules that express common relationships and interactions among the various networking primitives that may be implemented in virtual networks and that are provided by the provider network's services and APIs. Thus, embodiments may provide, in one location or file, virtual networking rules 238 that describe the logic of how virtual networking works in the provider network environment.

In some embodiments, the virtual network verification service 230 may obtain and encode rules for networking security standards such as the Payment Card Industry Data Security Standard (PCI DSS), the Federal Risk and Authorization Management Program (FedRAMP) standard, or the Health Insurance Portability and Accountability Act (HIPPA) standard, and thus sets of virtual networking rules 238 may be implemented that include rules for verifying networking security standards. In some embodiments, the virtual network verification service 230 may provide two or more different sets of virtual networking rules 238 that each encode different networking security standards that may be selectively used by clients to verify that their virtual networks conform to particular standards. In some embodiments, the virtual network verification service 230 may allow a client to define custom rules that encode the client's internal security standards, best practices, or other networking requirements, and thus sets of virtual networking rules 238 may be implemented that include custom rules defined by the clients for application to their particular virtual network.

At (2) of FIG. 2, query processing 260 logic of the service 230 may receive a query from the client to be resolved for the virtual network according to the virtual networking rules 238. In some embodiments, the client may provide the query about their virtual network on the provider network via a graphical interface or a command line interface (CLI) to the service API 232. In some embodiments, the query may be posed in an expressive language that is similar to SQL, but that applies to network configurations. Alternatively, in some embodiments, the queries may be posed in human-friendly ways. Example queries are described above in reference to FIG. 1.

At (3A) and (3B) of FIG. 2, description encoding 270 logic of the service 230 may obtain (3A) and encode (3B) a description of the virtual network. In some embodiments, description encoding 270 logic of the service 230 obtains descriptive information (3A) for the virtual network and encodes (3B) the descriptive information as an encoded description 240 for each query it receives to insure that the description 240 is up-to-date when resolving the query. However, in some embodiments, description encoding 270 logic may obtain and encode descriptive information for the virtual network, and process two or more queries using the encoded description 240. At (3A) of FIG. 2, description encoding 270 logic of the service 230 obtains descriptive information for the client's virtual network. The descriptive information may, for example, identify instances of the networking primitives that are implemented in the virtual network, include descriptions of the various instances (e.g., roles assigned to instances, permissions granted or denied to instances, IP addresses assigned to the instances, etc.), describe relationships among the instances (e.g., paths between instances), and describe interfaces or access points to external entities. In some embodiments, the client may obtain the descriptive information from the virtual network and provide the descriptive information to the virtual network verification service 230 with the query, as shown in FIG. 3. Alternatively, in some embodiments, the client may grant permission to the virtual network verification service 230 to allow the virtual network verification service 230 to obtain the descriptive information directly from the virtual network in response to the query, as shown in FIG. 4. At (3B) of FIG. 2, description encoding 270 logic of the service 230 may encode the obtained descriptive information as logic programs according to the declarative logic programming language.

At (4) of FIG. 2, query processing 260 logic of the service 230 may provide the query to the constraint solver 236. The constraint solver 236 resolves the constraint problem expressed by the query for the encoded description 240 according to the encoded rules 238, and at (5A) provides results (e.g., answers to the question posed by the query) to query processing 260 which formats the results and provides the formatted results to the client via the API 232 at (5B). The formatted results may include textual results (e.g., text that expresses an answer to a constraint posed by the query such as "YES", "NO", "TRUE", or "FALSE", a list of instances that meet a constraint posed by the query, etc.) and/or graphical results (e.g., a graphical representation of a relationship among two or more instances that was determined by resolving the query, a graphical representation of the virtual network identifying instances that were identified by resolving the query, etc.).

FIG. 3 illustrates a client providing descriptive information for a virtual network and queries to a virtual network verification service that processes the query and provides results to the client, according to some embodiments. At (1) of FIG. 3, the client, for example from a client device 382 on the client network as illustrated in FIG. 1, may obtain descriptive information from the client's virtual network 310 on the provider network. For example, in some embodiments, one or more provider network services of the provider network that maintain metadata describing virtual networks may provide a DESCRIBE or similar call via respective APIs that allow the client to request descriptive information for instances on their virtual network 310. At (2) of FIG. 3, the client may provide a query and the descriptive information to the service engine 334 of the provider network verification service 330 via service API 332. At (3A) of FIG. 3, the service engine 334 may encode the obtained descriptive information according to the declarative logic programming language, and provide the query and the encoded description to the constraint solver 336. The constraint solver 336 resolves the query for the encoded description according to the encoded virtual networking rules 338, and at (3B) provides results (e.g., answers to the question posed by the query) to service engine 334 which formats the results and provides the formatted results to the client via the API 332 at (4).

FIG. 4 illustrates a client providing queries and permission to access a virtual network to a virtual network verification service that obtains descriptive information from the virtual network, processes the query, and provides results to the client, according to some embodiments. At (1) of FIG. 4, the client, via a client account 488 with the provider network, may provide permission to the virtual network verification service 430 to obtain descriptive information from their virtual network 410. For example, in some embodiments, one or more provider network services of the provider network that maintain metadata describing virtual networks may provide DESCRIBE or similar calls via respective APIs that allow the client to request descriptive information for instances on their virtual network 410. The client may grant permission to service 430 to allow the service 430 to perform the DESCRIBE calls to the provider network service APIs for virtual network 410. In some embodiments, the client may grant only read permission for metadata of instances in the virtual network 410, and does not grant write or modify privileges for the metadata or for other data on or accessible through the virtual network 410. At (2) of FIG. 4, the client may provide a query to the service engine 434 of the provider network verification service 430 via service API 432. At (3) of FIG. 4, in response to the query, the service engine 434 may get descriptive information from the client's virtual network 410, for example using DESCRIBE calls to one or more provider network services that maintain metadata describing virtual networks via respective APIs. At (4A) of FIG. 4, the service engine 434 may encode the obtained descriptive information according to the declarative logic programming language, and provide the query and the encoded description to the constraint solver 436. The constraint solver 436 resolves the query for the encoded description according to the encoded virtual networking rules 438, and at (4B) provides results (e.g., answers to the question posed by the query) to service engine 434 which formats the results and provides the formatted results to the client via the API 432 at (5).

Figure 5:
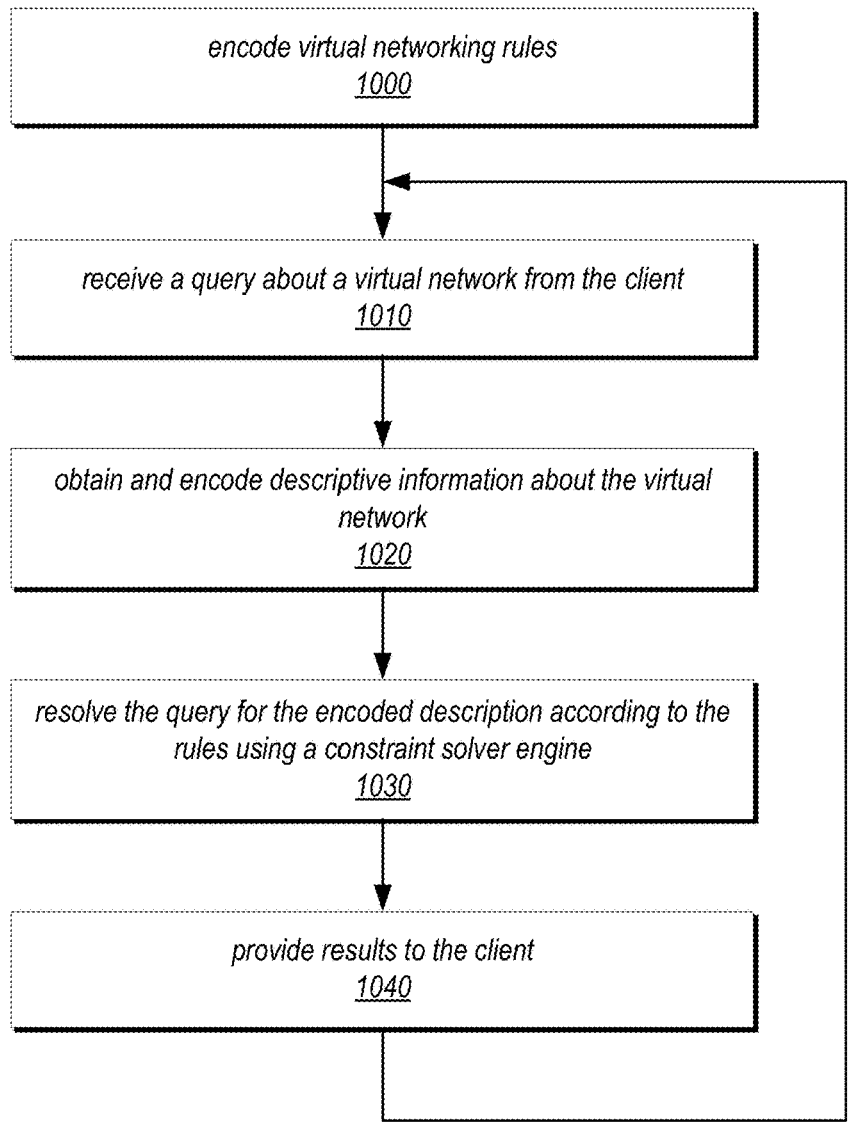
FIG. 5 is a high-level flowchart of a method for providing information about a virtual network to clients of a provider network, according to some embodiments.

FIG. 5 is a high-level flowchart of a method for providing information about a virtual network to clients of a provider network, according to some embodiments. As indicated at 1000, virtual networking rules may be obtained and encoded. Rules to be encoded may be obtained from the service provider, from the client, or from other external entities or sources. The virtual networking rules may express virtual networking semantics and logic for the networking primitives used in virtual networks on the provider network. In some embodiments, the virtual networking rules may express rules for networking security standards such as the Payment Card Industry Data Security Standard (PCI DSS), the Federal Risk and Authorization Management Program (FedRAMP) standard, or the Health Insurance Portability and Accountability Act (HIPPA). In some embodiments, the virtual networking rules may include client-defined rules that express the client's internal security standards or other networking requirements. Example encoded rules are provided later in this document.

As indicated at 1010, the virtual network verification service may receive a query about a virtual network from the client. In embodiments, the virtual network verification service may be used by a client, via a graphical interface to the service on a console or via a command line interface (CLI), to obtain answers to questions (posed as queries, including recursive queries) about their virtual network on the provider network. In some embodiments, a query may be posed in an expressive language that is similar to SQL, but that applies to network configurations. Alternatively, in some embodiments, the queries may be posed in human-friendly ways. Example queries are described above in reference to FIG. 1.

Figure 6:
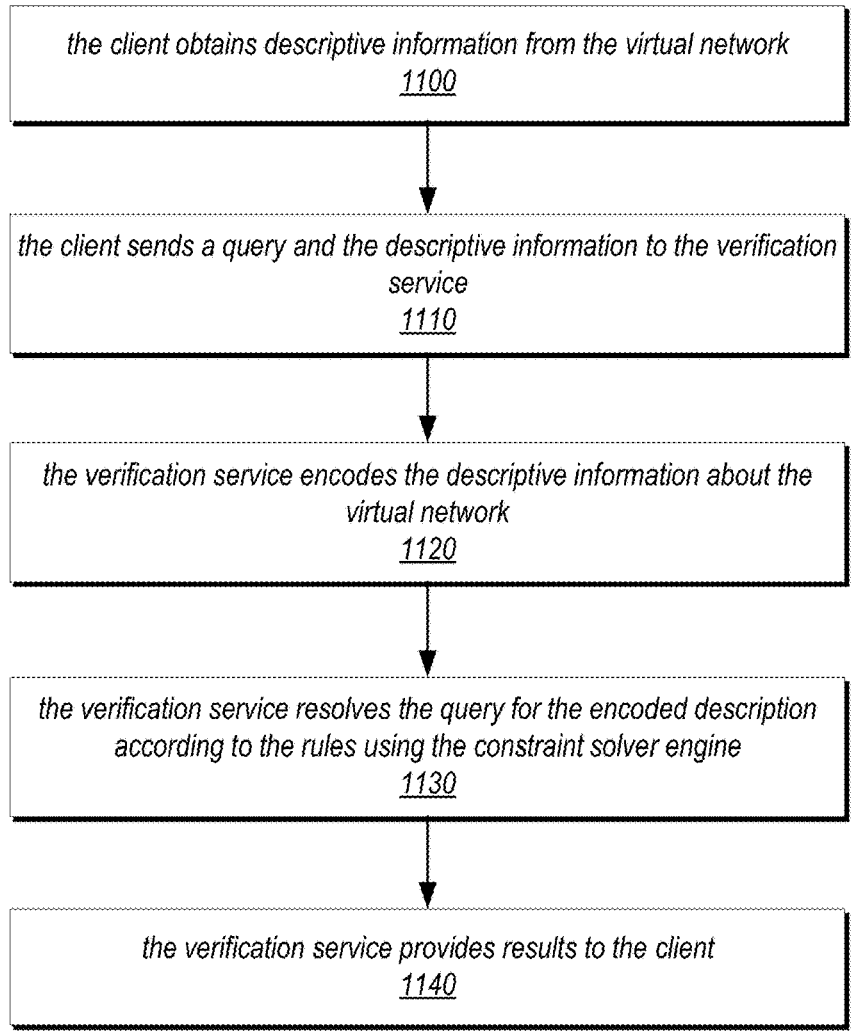
FIG. 6 is a flowchart of a method for providing information about a virtual network to clients of a provider network in which the client provides descriptive information and queries to a virtual network verification service, according to some embodiments.
Figure 7:
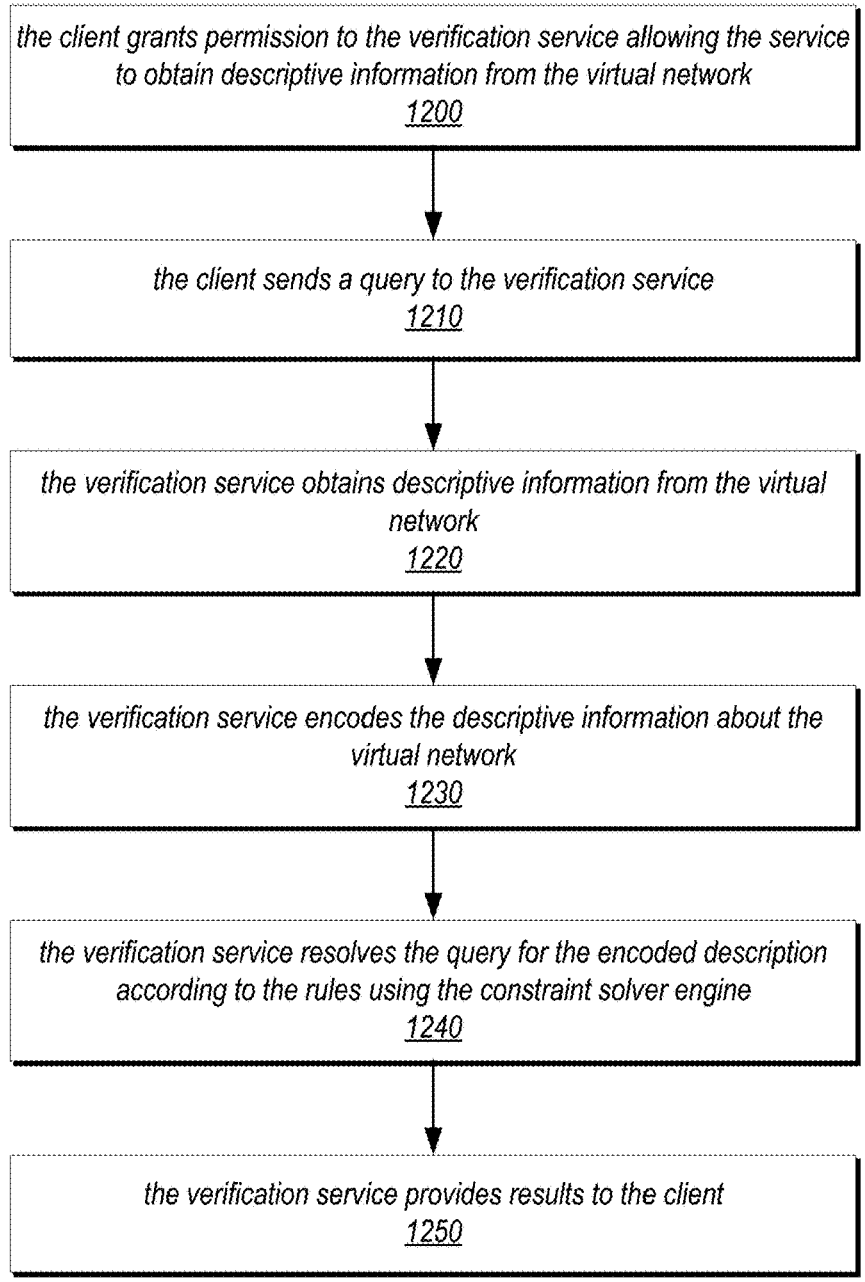
FIG. 7 is a flowchart of a method for providing information about a virtual network to clients of a provider network in which the client provides descriptive information and permissions to access a virtual network to a virtual network verification service, according to some embodiments.

As indicated at 1020, the virtual network verification service may obtain and encode descriptive information about the virtual network. The descriptive information may, for example, identify instances of the networking primitives that are implemented in the virtual network, include descriptions of the instances (e.g., roles assigned to computation instances, permissions granted to or denied to resource instances, IP addresses assigned to the instances, etc.), describe relationships among the instances (e.g., paths between instances), and describe interfaces or access points to external entities (e.g., computation instances that can be accessed by entities external to the virtual network). In some embodiments, the client may obtain the descriptive information from the virtual network and provide the descriptive information to the virtual network verification service, as illustrated in FIG. 6. Alternatively, in some embodiments, the client may grant permission to the virtual network verification service to allow the virtual network verification service to obtain the descriptive information directly from the virtual network, as illustrated in FIG. 7. The virtual network verification service may encode the descriptive information as logic programs according to a declarative logic programming language (e.g., Datalog).

As indicated at 1030, the virtual network verification service may resolve the query for the encoded description according to the encoded virtual networking rules using a declarative logic programming language (e.g., Datalog) constraint solver engine. As indicated at 1040, results of the query resolution (e.g., answers to the question posed by the query) may be formatted and provided to the client. The formatted results may include textual results (e.g., text that expresses an answer to a constraint posed by the query such as "YES", "NO", "TRUE", or "FALSE", a list of instances that meet a constraint posed by the query, etc.) and/or graphical results (e.g., a graphical representation of a relationship among two or more instances that was determined by resolving the query, a graphical representation of the virtual network identifying instances that were identified by resolving the query, etc.).

As indicated by the arrow returning from element 1040 to element 1010, elements 1010-1040 may be iteratively performed to pose and resolve multiple queries about the client's virtual network. In some embodiments, for example, the client may write a script that includes a series of queries, and run the script to pose the queries to and receive results from the virtual network verification service. As shown in FIG. 5, in some embodiments, the virtual network verification service may obtain descriptive information for the virtual network and encode the descriptive information as an encoded description for each query it receives to insure that the description is up-to-date when resolving the query. However, in some embodiments, the virtual network verification service may obtain and encode descriptive information for the virtual network, and process two or more queries using the encoded description.

FIG. 6 is a flowchart of a method for providing information about a virtual network to clients of a provider network in which the client provides descriptive information and queries to a virtual network verification service, according to some embodiments. As indicated at 1100, the client obtains descriptive information from the virtual network, for example using DESCRIBE calls provided by provider network service APIs. As indicated at 1110, the client sends a query and the descriptive information to the virtual network verification service. As indicated at 1120, the verification service encodes the descriptive information about the virtual network. As indicated at 1130, the verification service resolves the query for the encoded description according to the encoded virtual network rules using the constraint solver engine. As indicated at 1140, the virtual network verification service provides results of the query resolution to the client.

FIG. 7 is a flowchart of a method for providing information about a virtual network to clients of a provider network in which the client provides descriptive information and permissions to access a virtual network to a virtual network verification service, according to some embodiments. As indicated at 1200, the client grants permission to the virtual network verification service allowing the service to obtain descriptive information from the virtual network, for example permission to use DESCRIBE calls to one or more provider network services that maintain metadata describing virtual networks to obtain information for the virtual network. As indicated at 1210, the client sends a query to the virtual network verification service. As indicated at 1220, the virtual network verification service obtains descriptive information from the virtual network, for example using DESCRIBE calls to one or more provider network services that maintain metadata describing virtual networks. As indicated at 1230, the virtual network verification service encodes the descriptive information about the virtual network. As indicated at 1240, the virtual network verification service resolves the query for the encoded description according to the rules using the constraint solver engine. As indicated at 1250, the virtual network verification service provides results of the query resolution to the client.

Figure 8:
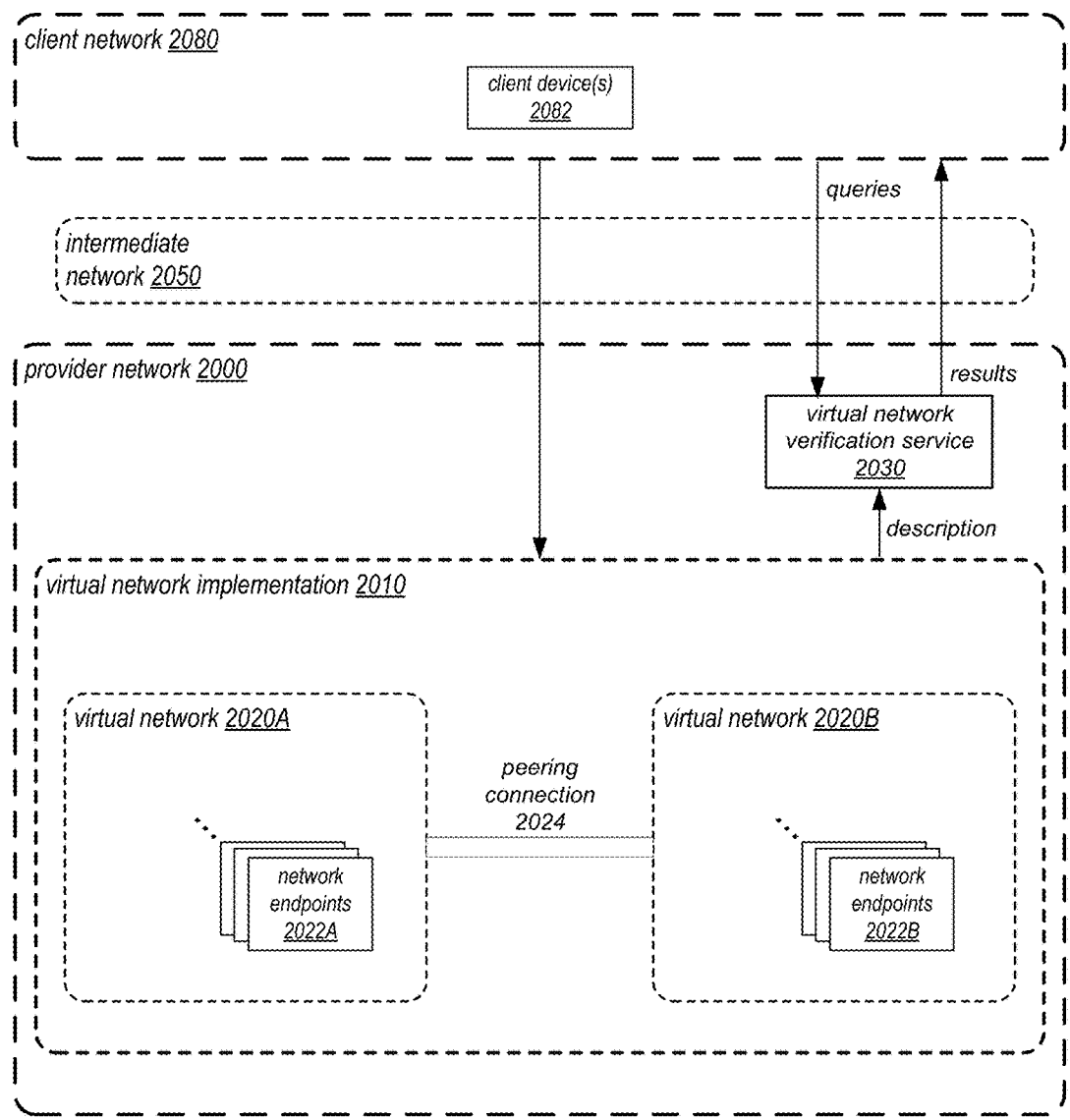
FIG. 8 illustrates a virtual network implementation in a provider network environment that includes peered virtual networks, according to some embodiments.

FIG. 8 illustrates a client's virtual network implementation in a provider network environment that includes two or more peered virtual networks, according to some embodiments. FIG. 8 is provided in part to describe example virtual networking rules that may be used in a virtual network verification service 2030 as described herein. As shown in FIG. 8, a client's virtual network implementation 2010 on a provider network 2000 may include two or more virtual networks 2020. FIG. 8 shows two virtual networks 2020A and 2020B in a client's virtual network implementation 2010. In some embodiments, virtual networks 2020A and 2020B may each include one or more subnets, and security groups may be established in virtual networks 2020A and 2020B (see, e.g., FIGS. 14 and 15). Network endpoints 2022A and 2022B represent network interfaces of the various instances of networking primitives (e.g., resource instances) in respective virtual networks 2020A and 2020B. A peering connection 2024 may be established over provider network 2000 between virtual networks 2020A and 2020B that allows instances on the virtual networks 2020A and 2020B to securely communicate over the provider network 2000 without having to traverse an external network 2050 such as the Internet.

Example rules for "private routing" are given below. These example are not intended to be limiting. "Routing" as used in these examples means, in the absence of firewalls, can IP packets flow from one endpoint 2022 to another endpoint 2022. Routing between two endpoints 2022 within the virtual network implementation 2010 may be referred to as "private routing." The rules may be different depending on whether both endpoints 2022 are in the same virtual network 2020 or in different virtual networks 2020 in the virtual network implementation 2010. The following describes example rules according to a descriptive logic programming language for determining if packets can flow between two endpoints 2022 in a virtual network implementation 2010:

```
routable-private: endpoint -> endpoint -> type
-: routable-private Endpoint1 Endpoint2
    <- routable-private-one-way Endpoint1 Endpoint2
    <- routable-private-one-way Endpoint2 Endpoint1
```

The first line defines the type for endpoints. Endpoint1 and Endpoint2 are variables. The rule (routable-private Endpoint1 Endpoint2) evaluates as true if (routable-private-one-way Endpoint1 Endpoint2) AND (routable-private-one-way Endpoint2 Endpoint1) are both true (and false otherwise). For routing between endpoints 2022 within a virtual network 2020, the rule routable-private-one-way may be defined as:

```
routable-private-one-way: endpoint -> endpoint -> type
-: routable-private-one-way Endpoint1 Endpoint2
    <- endpoint-has-virtual-network Endpoint1 Vnetwork
    <- endpoint-has-virtual-network Endpoint2 Vnetwork
```

Endpoint1 and Endpoint2 are variables. Vnetwork is the same variable (i.e., indicates the same virtual network 2020). This rule evaluates as true if both Endpoint1 and Endpoint2 are in the same virtual network 2020 (and false otherwise).

For routing between endpoints 2022 in different virtual networks 2020 through a peering connection 2024, the rule routable-private-one-way may be defined as follows. The text preceded by "//" are comments:

```
-: routable-private-one-way Endpoint1 Endpoint2
    // look up the IPs of the endpoints
        <- endpoint-has-private-ip Endpoint1 Ip1
        <- endpoint-has- private-ip Endpoint1 Ip2
    // look up the virtual networks of the endpoints
        <- endpoint-has-virtual-network Endpoint1 Vnetwork1
        <- endpoint-has-virtual-network Endpoint2 Vnetwork2
```

-continued

```
// look up the CIDRs (classless inter-domain routing) of the
peering
<- peered-cidrs Pcx Vnetwork1 Cidr1 Vnetwork2 Cidr2
// look up the source endpoint's route table
<- endpoint-has-rtb Endpoint1 Rtb1
// look up the CIDR of the route in the table, and verify the
route is active
<- atom/pcx-route Rtb1 Pcx Cidr3 route-state/active
// make sure all three CIDRs match respective IPs
<- cidr-matches-private-ip Cidr1 Ip1
<- cidr-matches-private-ip Cidr2 Ip2
<- cidr-matches-private-ip Cidr3 Ip2
```

Synthesizing Virtual Networks

In some embodiments, the virtual network verification service can be used in automatically synthesizing a virtual network that satisfies constraints, for example constraints posed in queries, so that the client does not have to build and test the virtual network themselves. For example, a client may want to establish a virtual network that complies with a particular networking security standard and/or with client-specified networking standards and that contains a specified set of networking primitives. Constraints imposed by the standards can be posed as queries, and the queries can be resolved to determine a virtual network configuration that satisfies the constraints, or alternatively to determine if the configuration of a virtual network conforms to the constraints. A virtual network that conforms to the constraints may then be synthesized, or alternatively a virtual network may be modified to conform to the constraints.

Figure 9:
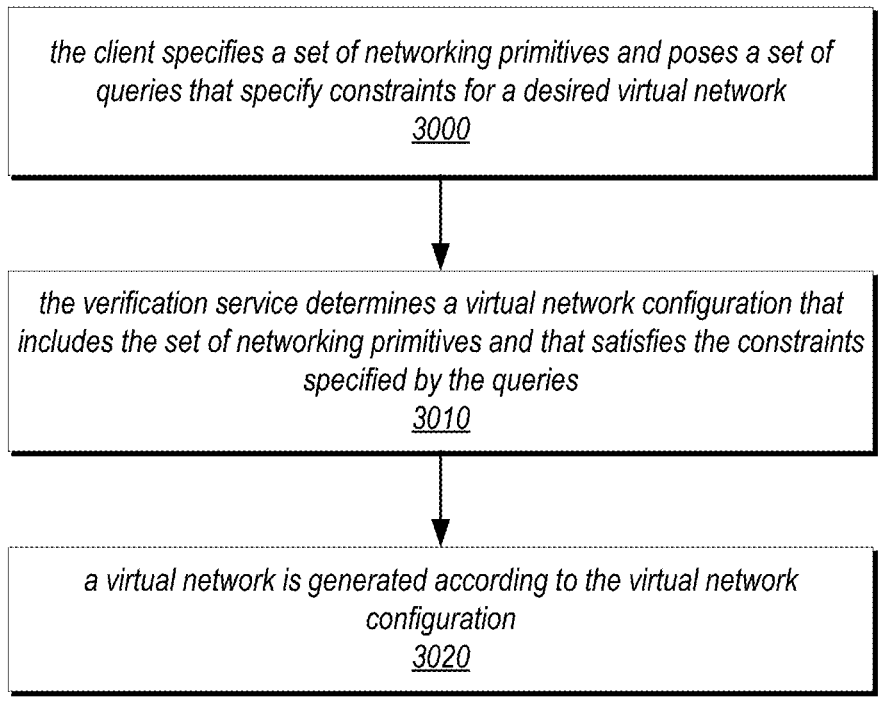
FIG. 9 is a flowchart of a method for automatically synthesizing virtual networks for clients, according to some embodiments.

FIG. 9 is a flowchart of a method for automatically synthesizing virtual networks for clients, according to some embodiments. As indicated at 3000, the client specifies a set of networking primitives and poses a set of queries that specify the constraints for a desired virtual network. As indicated at 3010, the verification service determines a virtual network configuration that includes the set of networking primitives and that satisfies the constraints specified by the queries according to a set of virtual networking rules. As indicated at 3020, a virtual network may then be generated on the provider network according to the virtual network configuration through appropriate provider network services.

Figure 10:
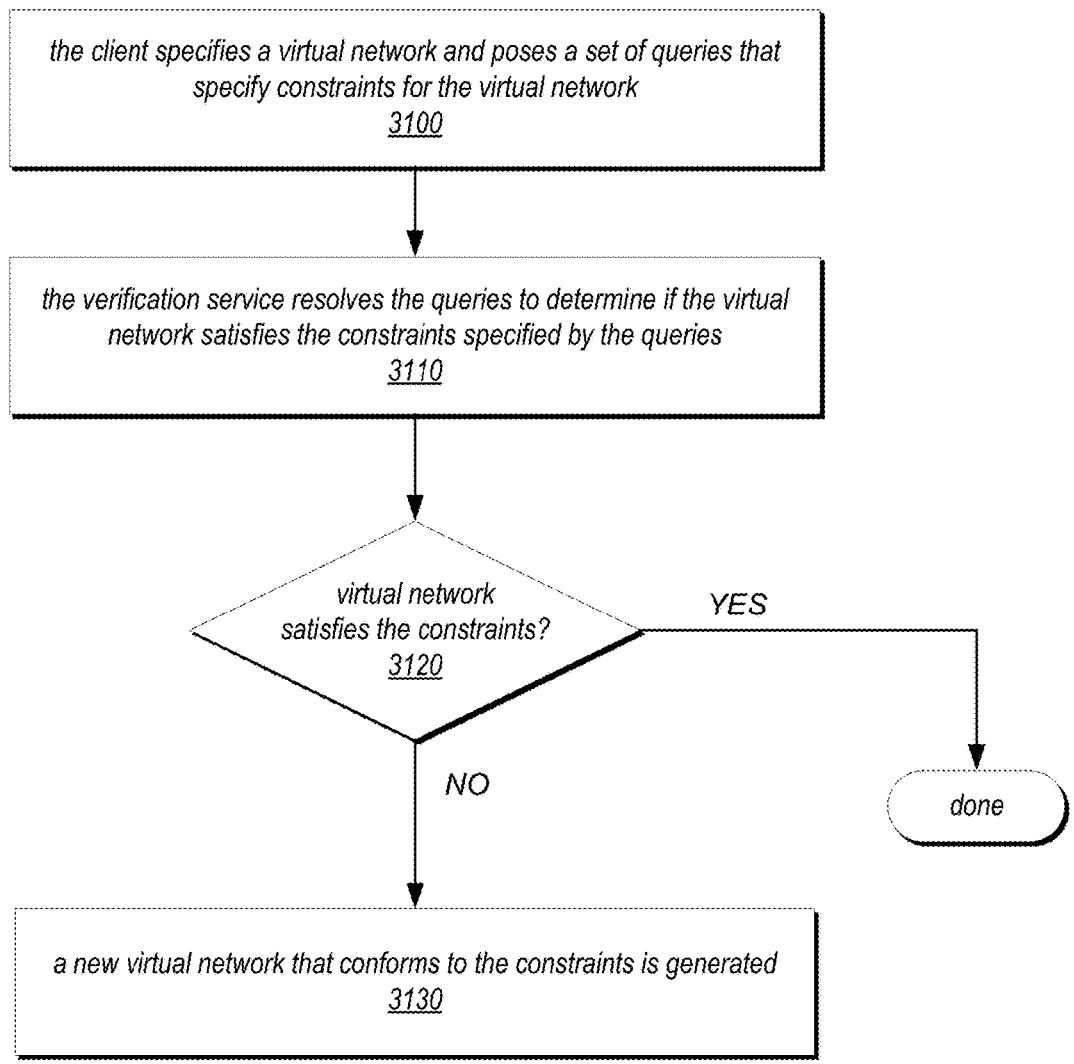
FIG. 10 is a flowchart of another method for automatically synthesizing virtual networks for clients, according to some embodiments.

FIG. 10 is a flowchart of another method for automatically synthesizing virtual networks for clients, according to some embodiments. As indicated at 3100, the client specifies an existing virtual network and poses a set of queries that specify constraints for the virtual network. As indicated at 3110, the verification service resolves the queries to determine if the virtual network satisfies the constraints specified by the queries according to a set of virtual networking rules. At 3120, if the existing virtual network satisfies the constraints, then the client may be informed, and the method is done. At 3120, if the existing virtual network does not satisfy the constraints, then a new virtual network that conforms to the constraints may be generated on the provider network through appropriate provider network services. Alternatively, in some embodiments, the existing virtual network may be modified through appropriate provider network services to satisfy the constraints.

Example Provider Network Environment

This section describes example provider network environments in which embodiments of the methods and apparatus described in reference to FIGS. 1 through 10 may be implemented. However, these example provider network environments are not intended to be limiting.

Figure 11:
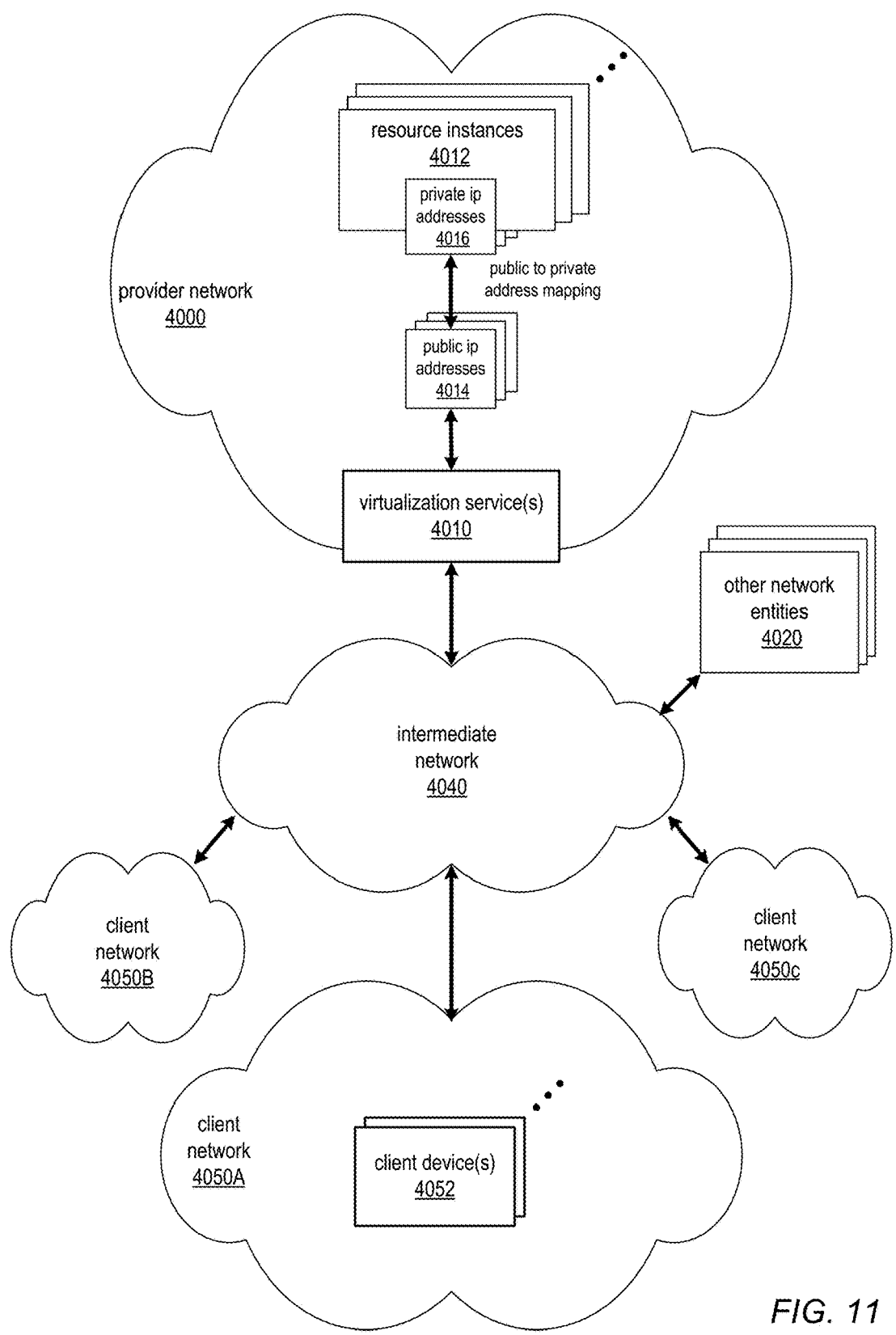
FIG. 11 illustrates an example provider network environment, according to some embodiments.

FIG. 11 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 12:
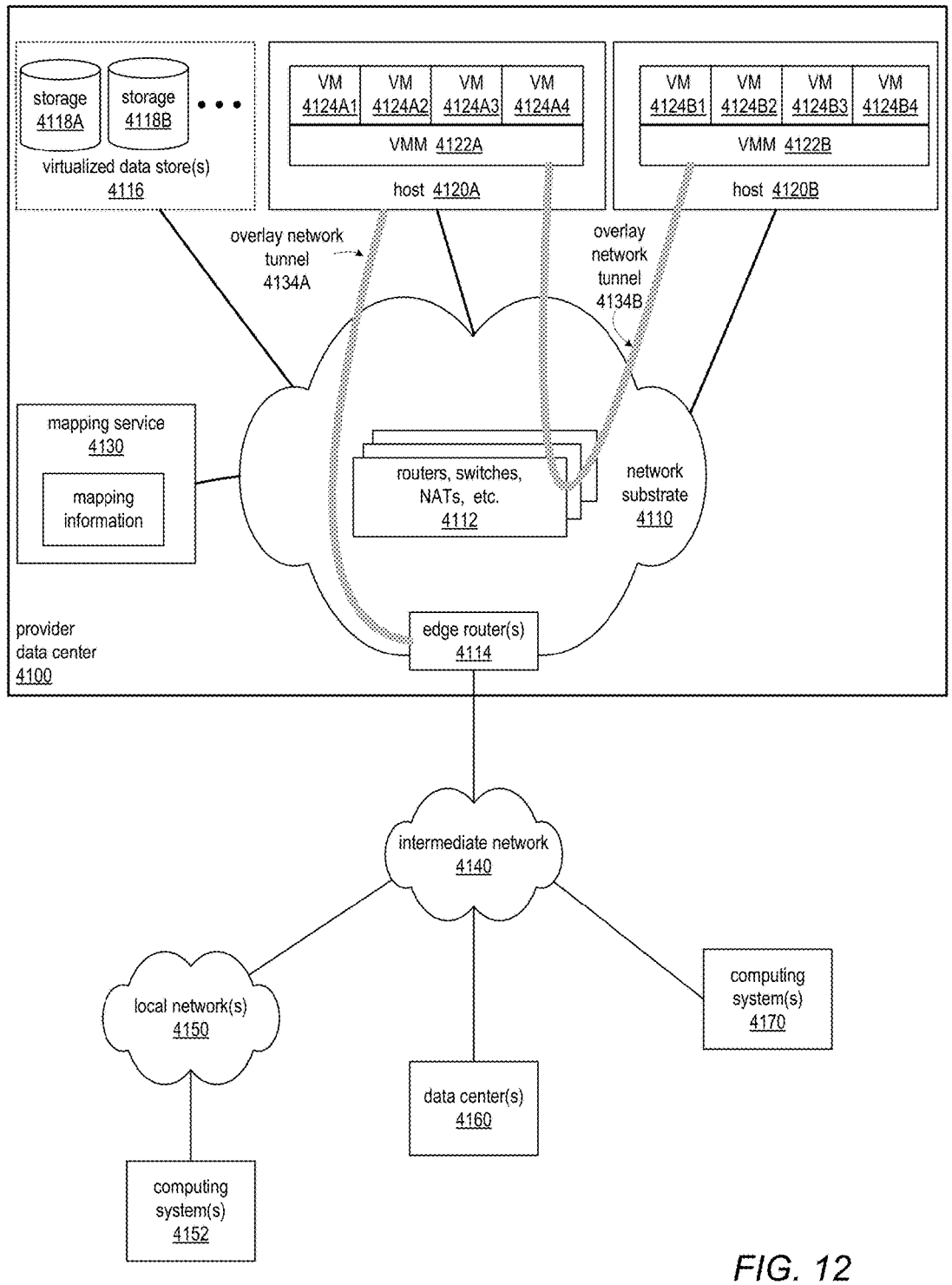
FIG. 12 illustrates an example data center that implements an overlay network on a network substrate using IP tunneling technology, according to some embodiments.

FIG. 12 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 12) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 12, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 12, at least some networks in which embodiments may be implemented may include hardware virtualization technology that enables multiple operating systems to run concurrently on a host computer (e.g., hosts 4120A and 4120B of FIG. 12), i.e. as virtual machines (VMs) 4124 on the hosts 4120. The VMs 4124 may, for example, be rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 12 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 4118, as virtualized resources to clients of a network provider in a similar manner.

Figure 13:
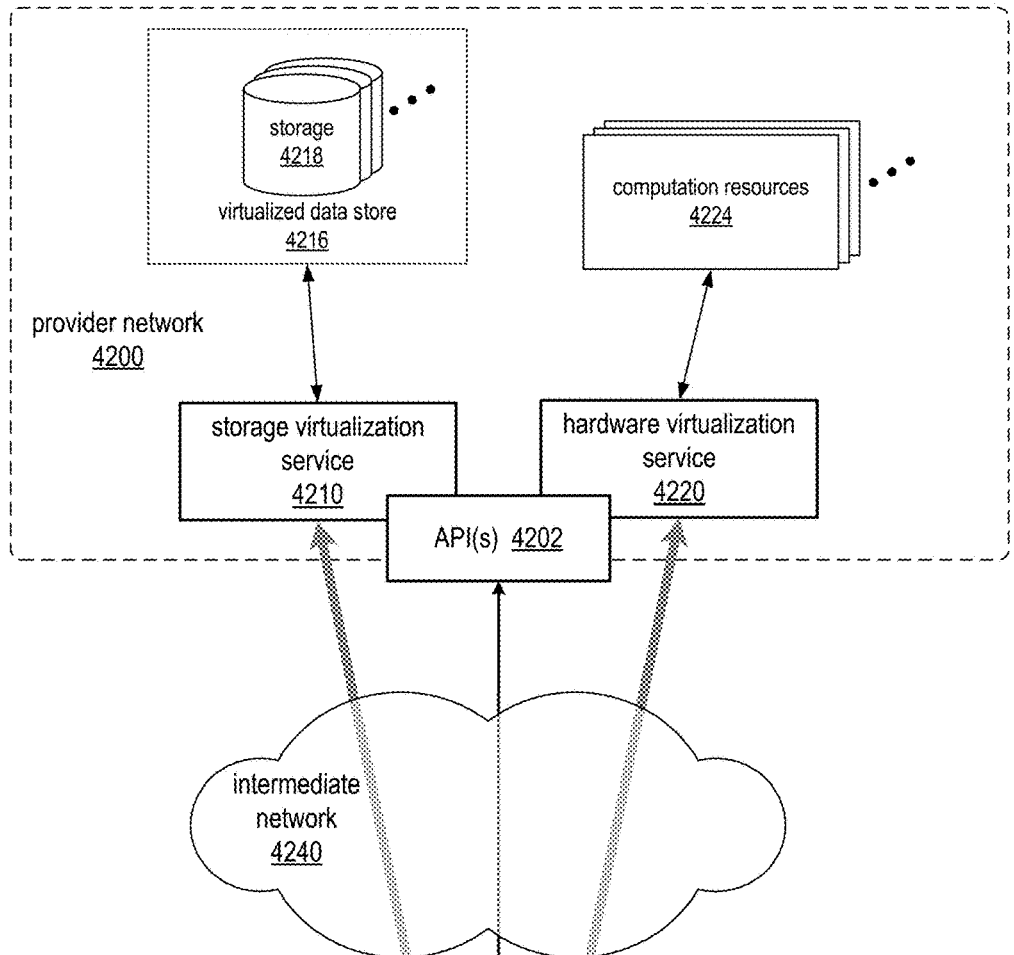
FIG. 13 is a block diagram of an example provider network that provides a storage virtualization service and a hardware virtualization service to clients, according to some embodiments.
Figure 13:
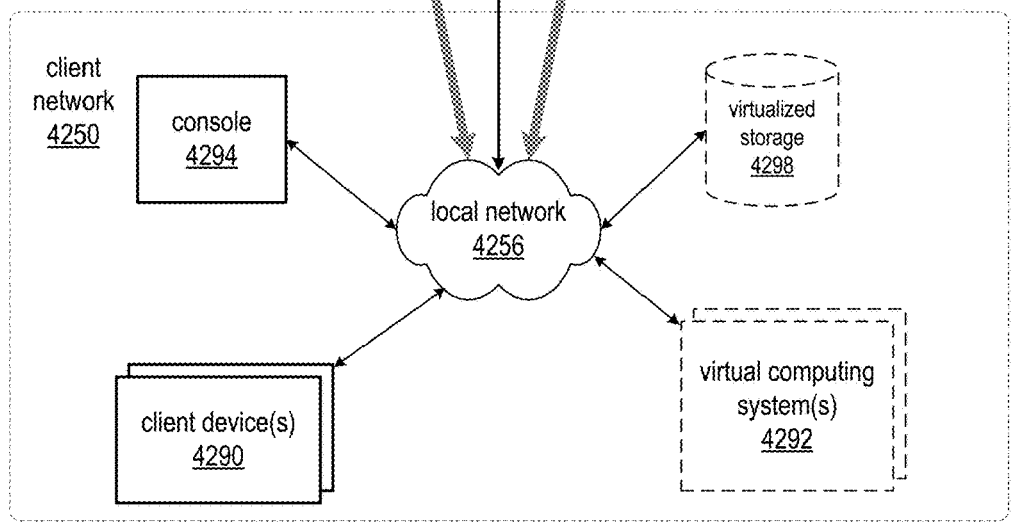

FIG. 13 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 13, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

FIG. 14 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 14 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 14 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

FIG. 15 illustrates subnets and security groups in an example virtual network on a provider network, according to some embodiments. In some embodiments, a provider network such as provider network 4300 in FIG. 14 may allow the client to establish and manage virtual security groups 4416 within the client's virtual network 4410, within or across subnets 4414. A security group 4416 is a logical grouping of resource instances 4418 and acts as a virtual firewall that controls the traffic allowed to reach one or more resource instances 4418 within the security group 4416 according to security group rules. The client may establish one or more security groups 4416 within the virtual network 4410, and may associate each resource instance 4418 in the virtual network 4410 with one or more of the security groups 4416. In some embodiments, the client may establish and/or modify rules for each security group 4416 that control the inbound traffic allowed to reach the resource instances 4418 associated with the security group 4416.

In the example virtual network 4410 shown in FIG. 15, the virtual network 4410 is subdivided into two subnets 4414A and 4414B. Access to the virtual network 4410 is controlled by gateway(s) 4430. Each subnet 4414 may include at least one router 4412 that acts to route traffic to (and from) resource instances 4418 on the respective subnet 4414. In some embodiments, network access control lists (ACLs) may be used to control access to the subnets 4414 at router(s) 4412. In the example shown in FIG. 15, resource instances 4418A through 4418E are on subnet 4414A, and resource instances 4418F through 4418J are on subnet 4414B. The client has established four security groups 4416A through 4416D. As shown in FIG. 15, a security group may extend across subnets 4414, as does security group 4416A that includes resource instances 4418A and 4418B on subnet 4414A and resource instance 4418F on subnet 4414B. In addition, a resource instance 4418 may be included in two or more security groups 4416, as is resource instance 4418A which is included in security group 4416A and 4416B.

Illustrative System

Figure 16:
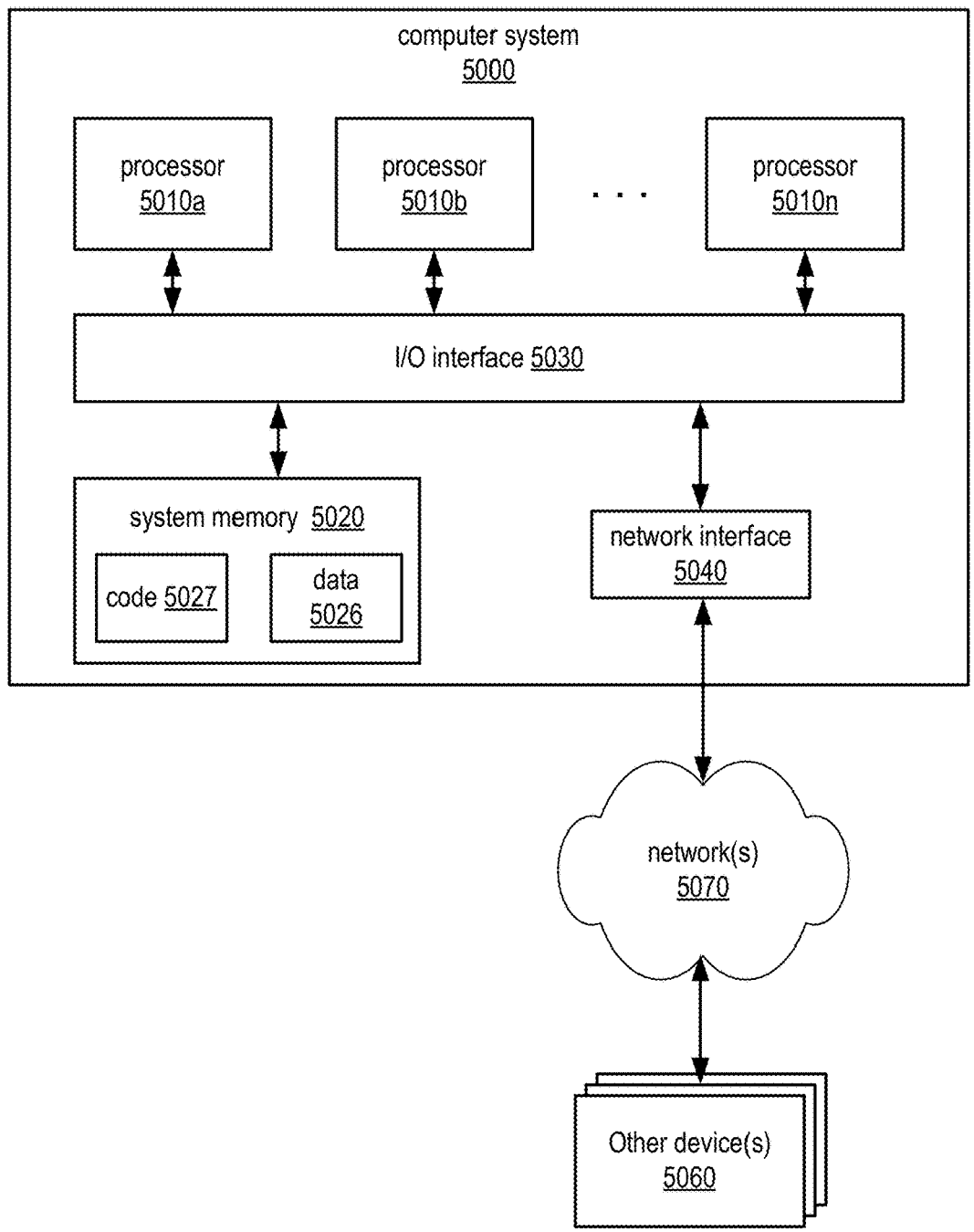
FIG. 16 is a block diagram illustrating an example computer system that may be used in some embodiments.

In some embodiments, a system that implements a portion or all of the methods and apparatus for verifying virtual networks in provider network environments as described herein may include a general-purpose computer system that includes or is configured to access one or more computer-accessible media, such as computer system 5000 illustrated in FIG. 16. In the illustrated embodiment, computer system 5000 includes one or more processors 5010 coupled to a system memory 5020 via an input/output (I/O) interface 5030. Computer system 5000 further includes a network interface 5040 coupled to I/O interface 5030.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 15, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 10 for implementing embodiments of methods and apparatus for verifying virtual networks in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer system including a processor coupled to a memory, the memory including instructions for a virtual network verification service that upon execution causes the system to:
    receive a query about a virtual network of a plurality of virtual networks from a particular client of a plurality of clients via a client device, wherein the query is expressed as a constraint problem, wherein the virtual network is instantiated for the particular client in a provider network and includes virtual machines, and wherein the provider network hosts the plurality of virtual networks for respective clients of the plurality of clients on a substrate network of the provider network;
    obtain rules for the particular client's virtual network, wherein one or more different rules apply to different individual ones of the plurality of virtual networks;
    encode the rules for the particular client's virtual network according to a declarative logic programming language to generate encoded virtual networking rules for the particular client's virtual network; and
    in response to the query:
        obtain descriptive information for the particular client's virtual network;
        encode the descriptive information for the particular client's virtual network according to the declarative logic programming language to generate an encoded description of the particular client's virtual network;
        resolve the query for the encoded description of the particular client's virtual network according to the encoded virtual networking rules using a constraint solver program, wherein the constraint solver program is configured to resolve constraint problems according to the declarative logic programming language and according to the encoded virtual networking rules; and
        provide results of the query resolution about the particular client's virtual network to the client device.

2. The system as recited in claim 1, wherein the memory further comprises instructions that upon execution cause the system to obtain the descriptive information from an application program interface of the provider network.

3. The system as recited in claim 1, wherein, the instructions that upon execution cause the system to obtain the descriptive information further comprise instructions that upon execution cause the system to:
    receive permission from the particular client to obtain the descriptive information for the particular client's virtual network from one or more provider network services; and
    obtain the descriptive information for the particular client's virtual network on the provider network from the one or more provider network services.

4. The system as recited in claim 1, wherein the descriptive information comprises one or more of information identifying instances of networking primitives that are implemented in the particular client's virtual network, descriptions of the virtual machines in the particular client's virtual network, descriptions of relationships among the virtual machines in the particular client's virtual network, or descriptions of interfaces to entities external to the particular client's virtual network.

5. The system as recited in claim 1, wherein the virtual networking rules for the particular client's virtual network include one or more of rules that encode virtual networking semantics and logic for networking primitives implemented in the particular client's virtual network, rules that encode one or more networking security standards, or client-defined rules that encode the client's networking requirements.

6. The system as recited in claim 1, wherein the queries are posed to verify that paths between virtual machines in the particular client's virtual network and other virtual machines in the particular client's virtual network are open, to verify that paths between virtual machines in the particular client's virtual network and one or more entities external to the particular client's virtual network are open, or to verify that virtual machines in the particular client's virtual network are not accessible by entities that should not have access to the virtual machines.

7. The system as recited in claim 1, wherein the results include one or more of a textual representation of the results of the query resolution about the particular client's virtual network or a graphical representation of the results of the query resolution about the particular client's virtual network.

8. A method, comprising:
performing, by a virtual network verification service implemented by one or more devices on a provider network:
receiving a query about a client's virtual network on the provider network, wherein the query expresses a constraint problem, and wherein the provider network hosts a plurality of virtual networks for respective clients of a plurality of clients;
obtain rules for the client's virtual network, wherein one or more different rules apply to different individual ones of the plurality of virtual networks;
encode the rules for the client's virtual network according to a declarative logic programming language to generate encoded virtual networking rules for the client's virtual network;
obtaining descriptive information for the client's virtual network;
encoding the descriptive information for the client's virtual network according to the declarative logic programming language to generate an encoded description of the client's virtual network;
resolving the query for the encoded description of the client's virtual network according to the encoded virtual networking rules using a constraint solver engine; and
providing results of the query resolution about the client's virtual network to the client.

9. The method as recited in claim 8, wherein the descriptive information is obtained from the client.

10. The method as recited in claim 8, wherein obtaining the descriptive information comprises:
obtaining permission from the client to get the descriptive information for the client's virtual network from one or more provider network services; and
obtaining the descriptive information for the client's virtual network on the provider network from the one or more provider network services.

11. The method as recited in claim 8, wherein the descriptive information comprises one or more of information identifying instances of networking primitives that are implemented in the client's virtual network, descriptions of virtual machines in the client's virtual network, descriptions of relationships among the virtual machines in the client's virtual network, or descriptions of interfaces to entities external to the client's virtual network.

12. The method as recited in claim 8, wherein the virtual networking rules for the client's virtual network include one or more of rules that encode virtual networking semantics and logic for networking primitives implemented in the client's virtual network, rules that encode one or more networking security standards, or client-defined rules that encode the client's networking requirements.

13. The method as recited in claim 8, further comprising receiving the rules for the client's virtual network from the client, wherein the rules for the client's virtual network include rules that specify best practices for virtual networks as defined by the client, and wherein the query is posed to verify that the client's virtual network conforms to the best practices.

14. The method as recited in claim 8, wherein the query is posed to verify that a path between a virtual machine in the client's virtual network and another virtual machine in the client's virtual network is open, to verify that a path between a virtual machine in the client's virtual network and one or more entities external to the client's virtual network is open, or to verify that a virtual machine in the client's virtual network is not accessible by entities that should not have access to the virtual machine.

15. The method as recited in claim 8, wherein providing results of the query resolution about the client's virtual network to the client comprises providing a textual representation of the results of the query resolution to the client or providing a graphical representation of the results of the query resolution to the client.

16. The method as recited in claim 8, further comprising receiving the query, obtaining the descriptive information, and providing the results of the query resolution according to an application programming interface to the virtual network verification service.

17. The method as recited in claim 8, wherein the client's virtual network includes two peered virtual networks, wherein the query is posed to verify that a virtual machine in a first peered virtual network can communicate with another virtual machine in a second peered virtual network via a peering connection between the peered virtual networks over the provider network.

18. A non-transitory computer-readable storage medium storing program instructions that when executed on one or more computers cause the one or more computers to:
receive one or more queries about a client's virtual network on a provider network, wherein the queries are expressed as constraint problems, and wherein the provider network hosts a plurality of virtual networks for respective clients of a plurality of clients;
obtain rules for the client's virtual network, wherein one or more different rules apply to different individual ones of the plurality of virtual networks;
encode the rules for the client's virtual network according to a declarative logic programming language to generate encoded virtual networking rules for the client's virtual network;
obtain descriptive information for the client's virtual network;
encode the descriptive information for the client's virtual network according to the declarative logic programming language to generate an encoded description of the client's virtual network;
resolve the one or more queries for the encoded description of the client's virtual network according to the encoded virtual networking rules using a constraint solver engine; and provide results of the resolution of the one or more queries about the client's virtual network to the client.

19. The non-transitory computer-readable storage medium as recited in claim 18, wherein the descriptive information is obtained from the client or from one or more provider network services that maintain metadata describing virtual networks.

20. The non-transitory computer-readable storage medium as recited in claim 18, wherein the descriptive information comprises one or more of information identifying instances of networking primitives that are implemented in the client's virtual network, descriptions of virtual machines in the client's virtual network, descriptions of relationships among the virtual machines in the client's virtual network, or descriptions of interfaces to entities external to the client's virtual network.

21. The non-transitory computer-readable storage medium as recited in claim 18, wherein the virtual networking rules for the client's virtual network include one or more of rules that encode virtual networking semantics and logic for networking primitives implemented in the client's virtual network, rules that encode one or more networking security standards, or client-defined rules that encode the client's networking requirements.

* * * * *